(12) United States Patent
Miyazaki et al.

(10) Patent No.: US 9,035,892 B2
(45) Date of Patent: May 19, 2015

(54) PORTABLE TERMINAL, INPUT CONTROL PROGRAM AND INPUT CONTROL METHOD

(75) Inventors: Kazuto Miyazaki, Daito (JP); Takashi Izumi, Daito (JP)

(73) Assignee: KYOCERA Corporation, Kyoto (JP)

( * ) Notice: Subject to any disclaimer, the term of this patent is extended or adjusted under 35 U.S.C. 154(b) by 267 days.

(21) Appl. No.: 13/505,937

(22) PCT Filed: Nov. 9, 2010

(86) PCT No.: PCT/JP2010/006572
§ 371 (c)(1),
(2), (4) Date: May 3, 2012

(87) PCT Pub. No.: WO2011/058736
PCT Pub. Date: May 19, 2011

(65) Prior Publication Data
US 2012/0212444 A1    Aug. 23, 2012

(30) Foreign Application Priority Data
Nov. 12, 2009  (JP) .................................. 2009-259360

(51) Int. Cl.
G06F 3/041    (2006.01)
G06F 3/045    (2006.01)
G06F 3/0488   (2013.01)

(52) U.S. Cl.
CPC .................................. G06F 3/04886 (2013.01)

(58) Field of Classification Search
CPC .. G06F 3/0236; G06F 3/0237; G06F 3/04883
USPC ................................................. 345/173–175
See application file for complete search history.

(56) References Cited

U.S. PATENT DOCUMENTS

| 5,734,928 A | 3/1998 | Nakasuji |
| 6,230,222 B1 | 5/2001 | Rush |

(Continued)

FOREIGN PATENT DOCUMENTS

| JP | 2001-344062 A | 12/2001 |
| JP | 2002-082765 A | 3/2002 |

(Continued)

OTHER PUBLICATIONS

Office Action dated Jun. 4, 2013, issued in counterpart Japanese Application No. 2009-259363.

(Continued)

Primary Examiner — Kevin M Nguyen
Assistant Examiner — Sejoon Ahn
(74) Attorney, Agent, or Firm — Procopio, Cory, Hargreaves & Savitch LLP

(57) ABSTRACT

A portable terminal operates while switching first mode for generating, based on a value indicating a degree of contact output by a touchpad, a value indicating degree of the contact for each contacted area and second mode for generating, based on the output value, a value by performing adjustment such that temporal change amount of the value indicating the degree is equal to or less than a predetermined value. When a value of one contacted area generated in the second mode equals or exceeds the first threshold, the portable terminal switches to the first mode, and when a value of one contacted area generated in the first mode falls below the second threshold, the portable terminal switches to the second mode. The portable terminal determines, as a target area to which processing to be performed is allocated, one contacted area having a value that equals or exceeds the first threshold.

6 Claims, 10 Drawing Sheets

(56) References Cited

U.S. PATENT DOCUMENTS

| | | | |
|---|---|---|---|
| 7,535,459 B2 | 5/2009 | You et al. | |
| 7,614,008 B2 | 11/2009 | Ording | |
| 7,821,425 B2 | 10/2010 | Philipp | |
| 8,102,286 B2 | 1/2012 | Philipp | |
| 8,144,121 B2 | 3/2012 | Kitaura | |
| 2002/0039092 A1 | 4/2002 | Shigetaka | |
| 2006/0132456 A1* | 6/2006 | Anson | 345/173 |
| 2006/0267959 A1* | 11/2006 | Goto et al. | 345/173 |
| 2007/0273561 A1 | 11/2007 | Philipp | |
| 2008/0007434 A1 | 1/2008 | Hristov | |
| 2008/0143671 A1 | 6/2008 | Li | |
| 2008/0303799 A1 | 12/2008 | Schwesig et al. | |
| 2008/0304890 A1* | 12/2008 | Shin et al. | 400/61 |
| 2009/0046110 A1* | 2/2009 | Sadler et al. | 345/660 |
| 2009/0061928 A1* | 3/2009 | Lee et al. | 455/556.1 |
| 2009/0122007 A1 | 5/2009 | Tsuzaki et al. | |
| 2009/0267922 A1* | 10/2009 | Umeda | 345/178 |
| 2009/0322701 A1* | 12/2009 | D'Souza et al. | 345/174 |
| 2010/0020043 A1* | 1/2010 | Park et al. | 345/174 |
| 2010/0134434 A1* | 6/2010 | Tu | 345/173 |
| 2010/0177057 A1* | 7/2010 | Flint et al. | 345/174 |
| 2010/0207890 A1* | 8/2010 | Chen | 345/173 |
| 2010/0271326 A1* | 10/2010 | Hu et al. | 345/174 |
| 2010/0291973 A1 | 11/2010 | Nakahara et al. | |
| 2011/0050628 A1* | 3/2011 | Homma et al. | 345/174 |
| 2011/0050629 A1* | 3/2011 | Homma et al. | 345/174 |
| 2011/0102357 A1* | 5/2011 | Kajitani | 345/173 |
| 2013/0106700 A1* | 5/2013 | Sugiura et al. | 345/168 |
| 2013/0120273 A1* | 5/2013 | Choi et al. | 345/168 |
| 2014/0184551 A1* | 7/2014 | Igarashi et al. | 345/173 |

FOREIGN PATENT DOCUMENTS

| | | |
|---|---|---|
| JP | 2004-126752 A | 4/2004 |
| JP | 2006-185338 A | 7/2006 |
| JP | 2008-071236 A | 3/2008 |
| JP | 2008-305174 A | 12/2008 |
| JP | 2009-116769 A | 5/2009 |
| JP | 2009-521035 A | 5/2009 |
| JP | 2009-239393 A | 10/2009 |
| WO | 2008/123546 A1 | 10/2008 |

OTHER PUBLICATIONS

International Search Report dated Jan. 11, 2011, issued for International Application No. PCT/JP2010/006572.

International Search Report dated Feb. 22, 2011, issued in the corresponding International Application No. PCT/JP2010/006571.

Office Action dated Apr. 12, 2012, issued in the corresponding U.S. Appl. No. 13/201,437.

* cited by examiner 4 key
Key contact value 5 key
Key contact value 1 key
Key contact value 2 key
Key contact value 7 key
Key contact value 4 key
Key contact value 5 key
Key contact value 1 key
Key contact value 7 key
Key contact value 8 key
Key contact value 5 key
Key contact value 0 key
Key contact value

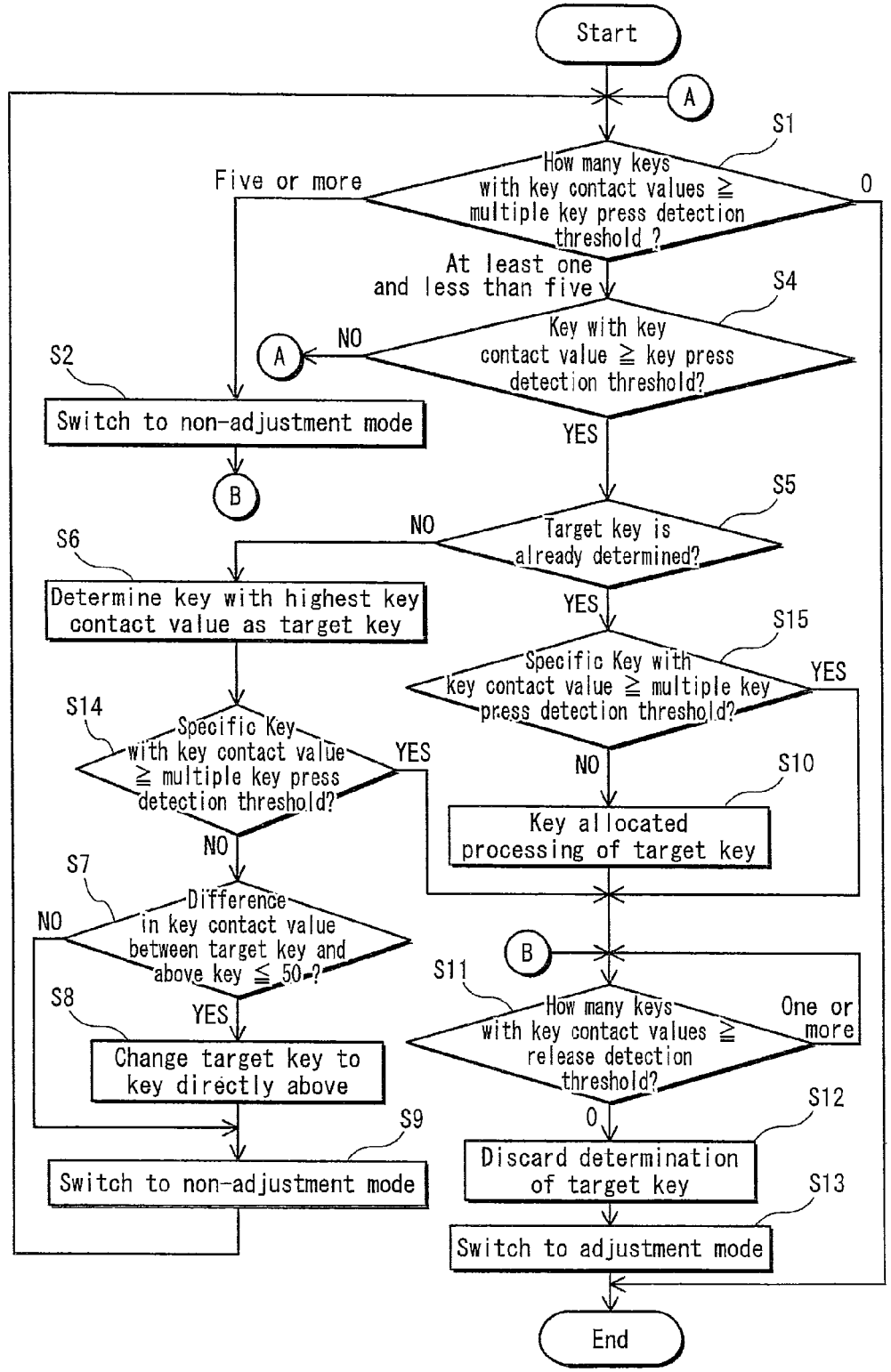

PORTABLE TERMINAL, INPUT CONTROL PROGRAM AND INPUT CONTROL METHOD

TECHNICAL FIELD

The present invention relates to a portable terminal such as a mobile phone having a touchpad, and in particular to a technology pertaining to performance of processing according to input from the touchpad.

BACKGROUND ART

According to portable terminals such as mobile phones which can be operated by using a touchpad, based on a value indicating a degree of contact made to the touchpad (value indicating an electrostatic capacitance, for example), a contact area on the touchpad to which the contact has been made is detected, and processing allocated to the contacted area is performed.

Accordingly, in the case where, for example, a user's body part besides his/her finger or the like contacts the touchpad (referred to hereinafter as "erroneous contact"), processing that user does not intend is performed (referred to hereinafter as an "erroneous operation").

In response to this problem, Patent Literature 1 discloses a control method, for example. According to this control method, it is judged as to whether the size of a contact area on a touchpad to which contact has been made exceeds a predetermined size value. When the size of the contacted area exceeds the predetermined size value, control is performed such that processing based on this contact is not performed.

Here, in the case where the method disclosed in the Patent Literature 1 is used, it can be assumed that an area on the touchpad, which has a value indicating a degree of contact made to the touchpad (value indicating an electrostatic capacitance, for example) that exceeds a predetermined threshold, is determined as a contacted area on the touchpad, and judgment is performed as to whether the determined contacted area exceeds the predetermined size value.

Accordingly, as the predetermined size value, a boundary value of area size is determined, which is the boundary between values in the case of contact made by the user's finger or the like and values in the case of contact made by the user's body part beside the finger or the like. As a result, in the case where contact is made to the touchpad by the user's body part beside his/her finger or the like, it is possible to prevent the occurrence of erroneous operations.

CITATION LIST

Patent Literature

[Patent Literature 1] Japanese Patent Application Publication No. 2004-126752

SUMMARY OF INVENTION

Technical Problem

According to a portable terminal which can be operated by using a touchpad, there is a problem, in addition to the above-described erroneous operations resulting from erroneous contact to the touchpad made by the user's body part besides his/her finger or the like. Specifically, even when contact is not actually being made to the touchpad, a value indicating a degree of contact to the touchpad exceeds the predetermined threshold due to noises resulting from operations of respective function units of making phone calls, taking photographs, and so on provided to a conventional portable terminal, and this leads to erroneous operations.

In response to this problem, it can be assumed that in the case where a temporal change amount in a value indicating a degree of contact to the touchpad, which is limited to less than a predetermined value, equals or exceeds the threshold, control is performed such that processing allocated to a contacted area is performed.

However, this method might lead to another problem that when the user tries to perform a normal operation by using his/her finger or the like, the user likely to feel that the portable terminal is less responsive to input performed on the touchpad by the user.

Specifically, in order to perform processing allocated to the contacted area, the above limited value needs to equal or fall below the threshold. A longer time period is necessary from when the user releases the finger or the like contacted the touchpad to when the limited value equals or falls below the threshold, compared with the case where the value is not limited as described above. As a result, it takes a longer time to allow the user to perform a subsequent operation. This might cause the user to feel that the portable terminal seems to be less responsive to input performed on the touchpad by the user.

The present invention has been conceived in view of such problems, and a purpose thereof is to provide a portable terminal such as a mobile phone, which is capable of reducing erroneous operations due to input from a touchpad without giving the user an impression that the portable terminal seems to be less responsive to input performed on the touchpad by the user.

Solution to Problem

In order to solve the above-presented problems, the present invention provides a portable terminal comprising: a touchpad configured to detect contact made thereto and output a value indicating a degree of the contact; an adjustment unit configured to generate, based on the value output by the touchpad, an area contact value for each of one or more contacted areas of the touchpad to which the contact has been made, while being switched between a first mode for generating, as the area contact value, a value indicating a degree of the contact to the contacted area and a second mode for generating, as the area contact value, a value by performing adjustment such that a temporal change amount of the value indicating the degree of the contact to the contacted area is equal to or less than a predetermined value; a storage unit configured to store therein a first threshold and a second threshold less than the first threshold; a switch control unit configured to, when an area contact value of one of the contacted areas generated by the adjustment unit in the second mode equals or exceeds the first threshold, switch the adjustment unit to the first mode, and when an area contact value of one of the contacted areas generated by the adjustment unit in the first mode falls below the second threshold, switch the adjustment unit to the second mode; and a determination unit configured to determine, as a target area to which processing to be performed is allocated, one of the contacted areas having an area contact value that equals or exceeds the first threshold.

Here, the term "contact" not only refers to a state where a user's finger, face, or other body parts, or objects such as a touch pen is put into direct contact with the touchpad. Especially when the touchpad is a capacitive touchpad, the term "contact" also refers to a state where a user's finger, face, or other body parts, or objects such as a touch pen comes in close proximity to the touchpad and thus, changes the electrostatic capacity of the touchpad by a greater degree than a predetermined level of change.

Advantageous Effects of the Invention

According to the portable terminal of the present invention having the above-described structure, it is possible to reduce erroneous operations due to input from a touchpad without giving a user an impression that the portable terminal seems to be less responsive to input performed on the touchpad by the user.

BRIEF DESCRIPTION OF DRAWINGS

FIG. 10 is a flow chart illustrating control processing performed by a modified mobile phone in response to input from the touchpad 102.

DESCRIPTION OF EMBODIMENTS

In the following, description is made on a mobile phone as one embodiment of the portable terminal pertaining to the present invention.

<Embodiment 1>
<Exterior Appearance>

Figure 1:
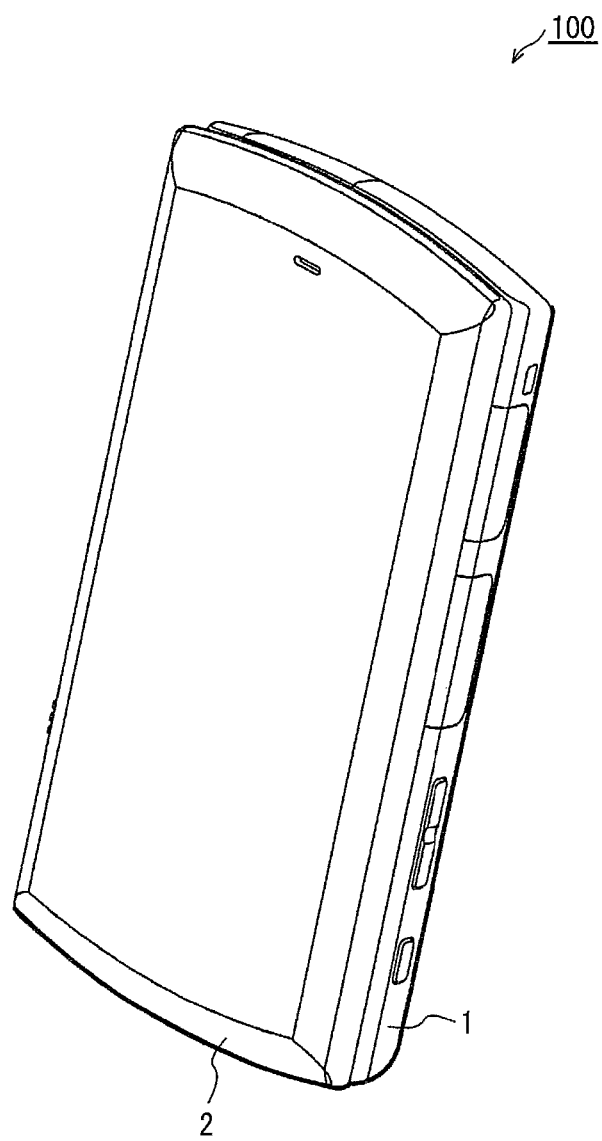
FIG. 1 is a perspective view illustrating the exterior appearance of a mobile phone 100 pertaining to embodiment 1 during a closed state thereof.
Figure 2:
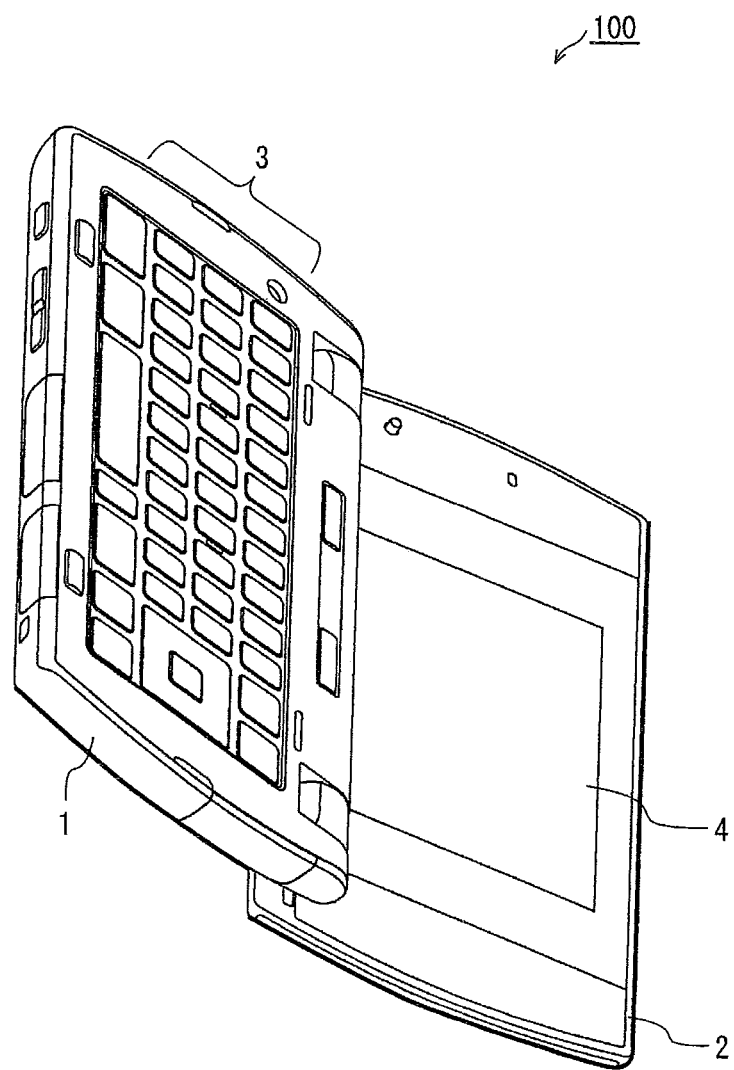
FIG. 2 is a perspective view illustrating the exterior appearance of the mobile phone 100 pertaining to embodiment 1 during an open state thereof.
Figure 3:
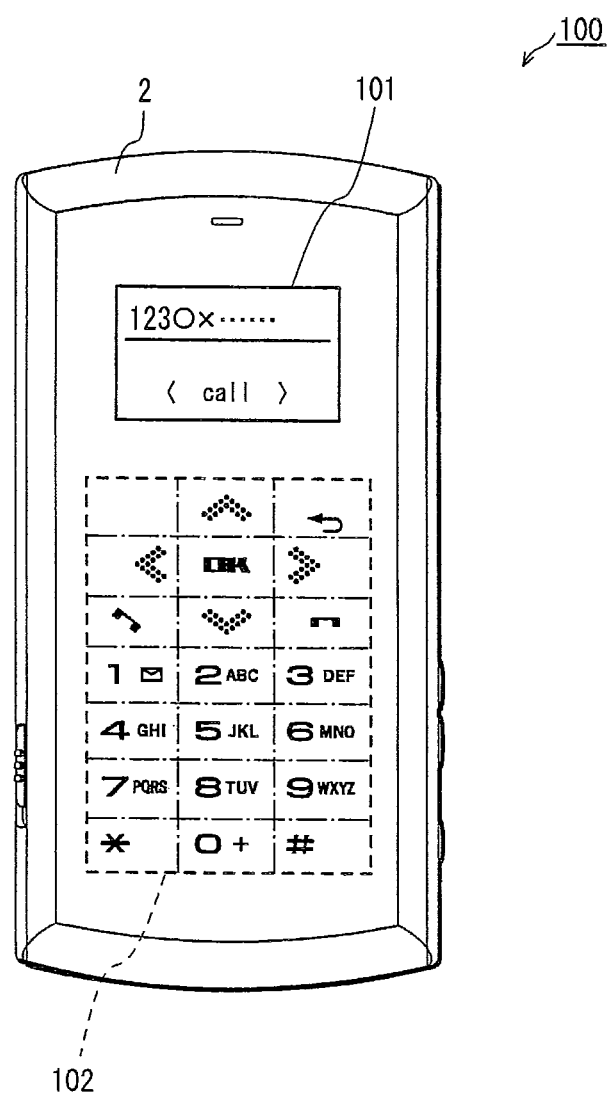
FIG. 3 is a front elevational view illustrating the exterior appearance of the mobile phone 100 pertaining to embodiment 1 during a closed state thereof.

FIG. 1 is a perspective view illustrating the exterior appearance of a mobile phone 100 pertaining to embodiment 1 during a closed state thereof. FIG. 2 is a perspective view illustrating the exterior appearance of the mobile phone 100 pertaining to embodiment 1 during an open state thereof. FIG. 3 is a front elevational view illustrating the exterior appearance of the mobile phone 100 pertaining to embodiment 1 during a closed state thereof.

As illustrated in FIGS. 1 and 2, the mobile phone 100 is a flip-type mobile phone which opens vertically with respect to a longitudinal direction thereof. The mobile phone 100 is composed of a housing 1 and a housing 2 which are joined in a mutually openable state. The housing 1 is provided with input keys 3, and the housing 2 is provided with an LCD (Liquid Crystal Display) 4 which is used as a screen for displaying information.

In addition to the above, and although not depicted in FIG. 1, the mobile phone 100 includes a sub LCD 101 and a touch pad 102, both of which are disposed on an external surface of the housing 2 which is exposed to the outside when the mobile phone 100 is in a closed state thereof. Illustrations of the sub LCD 101 and the touchpad 102 are found in FIG. 3.

The touchpad 102 has provided thereon marks which represents respective various keys of the mobile phone 100. These marks representing the various keys are made visible to a user. The user causes the mobile phone 100 to perform processing allocated to a certain key by putting his/her finger or the like in contact with a location on the touchpad 102 having the mark representing the certain key.

In FIG. 3, the touchpad 102 is illustrated as being divided into multiple areas by dashed-dotted lines. Each of the areas indicates an area (approximately 5 mm×10 mm, for example) corresponding to one of the keys. Note that the dashed-dotted lines are illustrated for the mere sake of explanation, and are not visible to the user. Further, the key indicated by the mark "1" is referred to, for example, as the "1 key" hereinafter, and the same applies to the keys represented by the rest of the marks illustrated in FIG. 3.

In addition, it is to be noted that the types of keys which are provided to the touchpad 102 and the order in which the keys are arranged in the illustration of FIG. 3 are mere examples, and are to be altered as necessary.

Additionally, in the present embodiment, the term "contact" not only refers to a state where a user's finger, face, or other body parts, or objects such as a touch pen is put into direct contact with the touchpad. The term "contact" also refers to a state where a user's finger, face, or other body parts, or objects such as a touch pen, all of which being capable of changing the electrostatic capacity of the touchpad 102, comes in close proximity to the touchpad and thus, causes a later-described key contact value (refer to FIG. 5) to equal or exceed a GND level.

Further, in the following explanation, the term "press" is used to indicate a state where the user contacts the touchpad 102 with the use of his/her finger or the like, and thereby selects a key on the touchpad 102.

<Structure>

Figure 4:
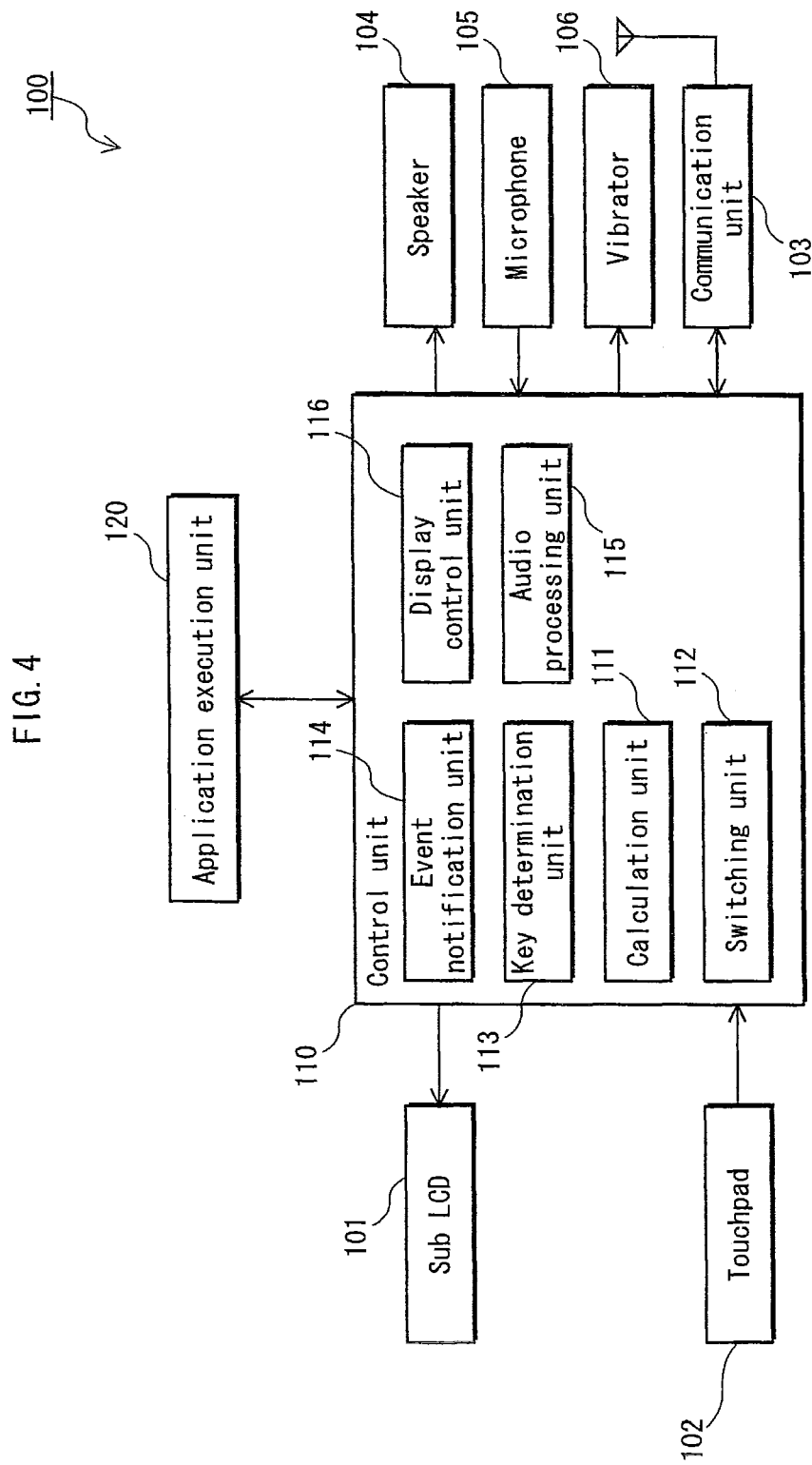
FIG. 4 is a block diagram illustrating the functional structure of the main units of the mobile phone 100.

FIG. 4 is a block diagram illustrating the functional structure of main units of the mobile phone 100.

As illustrated in FIG. 4, the mobile phone 100 includes a sub LCD 101, the touchpad 102, a communication unit 103, a speaker 104, a microphone 105, a vibrator 106, a control unit 110, and an application execution unit 120.

The mobile phone 100 includes a processor and a memory in the structure thereof. The functions of the control unit 110 and the application execution unit 120 are realized by the processor executing a program stored onto the memory. Note that, hereinafter, it is presumed that various threshold values, which are to be later described, are stored onto the memory.

The sub LCD 101 displays images such as characters by receiving instructions from the control unit 110.

The touchpad 102 is embodied by a conventional capacitive touch sensor. The touchpad 102 is a circuit for detecting contact made thereto by the user and for transmitting at least one pair of values to the control unit 110 while the contact is being detected. Each of the at least one pair of values consists of a coordinate value (x, y) indicating a position on the touchpad to which contact is made, and a value indicating the electrostatic capacity of the contacted position. More specifically, the touchpad 102, while contact is being detected, transmits the at least one pair of values to the control unit 110 every time a unit interval (25 ms, for example) elapses, and when contact is being made to multiple positions on the touchpad 102, the touchpad 102 transmits a plurality of pairs of values to the control unit 110.

In FIG. 3, the touchpad 102 is illustrated as a rectangular area surrounded by broken lines. As for examples of coordinate values of positions on the touchpad 102, the top left vertex of the rectangle representing the touchpad 102 is denoted by a coordinate value (0, 0), whereas the bottom right vertex of the rectangle representing the touchpad 102 is denoted by a coordinate value (160, 220).

The communication unit 103 is a circuit for performing transmission/reception of radio waves with a base station via an antenna. More specifically, the communication unit 103 is provided with the functions of: receiving signals from the base station; demodulating the received signals; and transmitting the demodulated signals to the control unit 110, as well as the functions of: receiving signals transmitted from the control unit 110; modulating the received signals; and transmitting the modulated signals to the base station.

The control unit 110 has, in addition to the functions provided to a conventional mobile phone, the functions of an OS (operating system). That is, the control unit receives the at least one pair of values from the touchpad 102, and, based on the at least one pair of values received, notifies the application execution unit 120 of an event. As already described in the above, each of the at least one pair of values consists of a coordinate value of the contacted position and an electrostatic value of the contacted position. Further, the event includes information identifying a key of the touchpad 102 being pressed. The control unit 110 includes: a calculation unit 111; a switching unit 112; a key determination unit 113; an event notification unit 114; an audio processing unit 115; and a display control unit 116.

The calculation unit 111 performs the management of positions (coordinate areas) of the keys on the touchpad 102. In addition, the calculation unit 111 calculates a value (referred to hereinafter as a "key contact value") which increases/decreases within a range between 0-1024, for each of the keys contacted. The calculation is based on the at least one pair of values transmitted by the touchpad 102, each of which consisting of a coordinate value (x, y) indicating a contacted position and the electrostatic capacity value of the contacted position.

Furthermore, the calculation unit 111 switches between two modes according to instructions provided by the switching unit 112, one of the modes being a non-adjustment mode and the other being an adjustment mode. As already mentioned above, the calculation unit 111 calculates, for each of the contacted keys, a value which increases/decreases between 0-1024 according to the increase/decrease of contact area within a coordinate area corresponding to the contacted key. Following this, in the non-adjustment mode, the calculation unit 111 sets the calculated value as the key contact value without performing any adjustment. On the other hand, in the adjustment mode, the calculation unit 111 sets, as the key contact value, a value obtained by performing adjustment on the calculated value. More specifically, the calculation unit in the adjustment mode performs the adjustment such that an amount of change, or a difference, between a key contact value of a contacted key and a previous key contact value of the same contacted key which has been determined a unit interval ago (25 ms, in this example) is smaller than or equal to a predetermined value ("30", in the following description). The same calculation and adjustment is performed for each of the contacted keys.

Thus, in the adjustment mode, when the difference between the calculated value of a contacted key and the previous key contact value of the same contacted key which has been determined a unit interval ago is smaller than or equal to the predetermined value, the calculated value is set as the key contact value. On the other hand, when the difference between the calculated value of the contacted key and the previous key contact value of the same contacted key is greater than the predetermined value, the key contact value is determined as a value obtained by adding the predetermined value to the previous key contact value.

As the calculated value of a contacted key, or that is, the value which increases/decreases between 0-1024 according to the increase/decrease of contact area within a coordinate area corresponding to the contacted key, a value obtained by performing scale conversion on a sum total of the electrostatic capacity values within the coordinate area of the contacted key such that the converted value is between 0-1024 may be used, for example.

Detailed description on how a key contact value of a contacted key changes according to the switching between the two modes of the calculation unit 111 is provided in the following (refer to FIG. 5).

The switching unit 112 causes the calculation unit 111 to switch between the two modes thereof according to the current mode of the calculation unit 111 (non-adjustment mode or adjustment mode) and the key contact values calculated by the calculation unit 111.

In detail, the switching unit 112 causes the calculation unit 111 to switch from the adjustment mode to the non-adjustment mode when a key contact value calculated by the calculation unit 111 exceeds a key press detection threshold. In contrast, the switching unit 112 causes the calculation unit 111 to switch from the non-adjustment mode to the adjustment mode when all of the key contact values calculated by the calculation unit 111 fall below a release detection threshold.

Here, the key press detection threshold is a threshold used for judging whether a key has been pressed, and a value thereof is, for example, "632". The release detection threshold is a threshold used for judging whether a key has been released, and a value thereof is, for example, "580".

Detailed explanation of the timing at which the switching unit 112 causes the calculation unit 111 to switch between the two modes thereof is provided in the following (refer to FIG. 5).

The key determination unit 113 determines one key (referred to hereinafter as a "target key") according to the key contact values calculated by the calculation unit 111. As mentioned in the following, the mobile phone 100 executes processing allocated to the target key.

The key determination unit 113 generally determines, as the target key, a key having the greatest key contact value among the keys having key contact values equal to or greater than the key press detection threshold (632). However, exceptional cases exist, where the target key is not determined in such a manner. Such cases include (i) a case (referred to hereinafter as "multiple key press") where the number of keys having key contact values equal to or greater than a multiple key press detection threshold ("580", for example) exceeds a predetermined number of keys, and (ii) a case where there exists, between a combination of two of the keys having key contact values equal to or greater than a multiple key press detection threshold, a key having a key contact value smaller than or equal to the release detection threshold (580).

Such cases are exceptional, since, in such cases, it can be assumed that erroneous contact is being made to the touchpad 102. That is, the contact is not a result of a normal user operation where the user contacts the touchpad 102 using his/her fingers or the like. Therefore, in cases where erroneous contact is being made to the touchpad 102, it is necessary to prevent the target key from being determined and accordingly to prevent the processing allocated to the target key (referred to as "key allocated processing" hereinafter) from being erroneously executed. Erroneous contact as referred to herein includes contact being made to the touchpad 102 in such cases as where a user's face or the like contacts the touchpad 102 during a calling, or where an object which is disposed in a user's bag along with the portable terminal contacts the touchpad 102 of the portable terminal.

Further, with regards to the above-stated predetermined number of keys according to which multiple key press is determined, the predetermined number of keys is to be set to a number of keys which cannot be simultaneously contacted when the user is making operations to the keys by using his/her finger or the like. In the following description, the predetermined number of keys is set presuming that, when the user is using one finger to make key operations on the touchpad 102, the maximum number of keys the user can simultaneously contact is four. The four keys which can be simultaneously contacted in such a case include: a key the user intends to press; a key located either to the right of or to the left of the intended key; a key located either above or below the intended key; and a key adjacent to the intended key in a diagonal direction. Therefore, based on this presumption, multiple key press is determined in cases where five or more keys are detected having key contact values equal to or greater than the multiple key press detection threshold. Further, in the following description, it is also presumed that, once the key determination unit 113 determines a target key, the determination of a subsequent target key is not performed until the key contact values of all of the keys of the touchpad 102 fall below or equal the release detection threshold.

The event notification unit 114 notifies the application execution unit 120 of an event. An event includes information identifying the target key which has been determined by the key determination unit 113.

The audio processing unit 115 performs D/A (Digital/Analog) conversion of audio signals received via the communication unit 103 and outputs the converted signals audio via the speaker 104. Additionally, the audio processing unit 115 performs A/D (Analog/Digital) conversion on audio signals input from the microphone 105, and transmits the converted audio signals via the communication unit 103.

The display control unit 116 causes the sub LCD 101 to display images and the like according to instructions received from the application execution unit 120.

The application execution unit 120 is an event-driven application which executes processing in accordance with the event notified from the control unit 110.

<Key Contact Value>

In the following, description is made on how a key contact value of a key contacted by a user's finger or the like changes according to which mode the calculation unit 111 is in, with reference to the accompanying FIG. 5.

Figure 5:
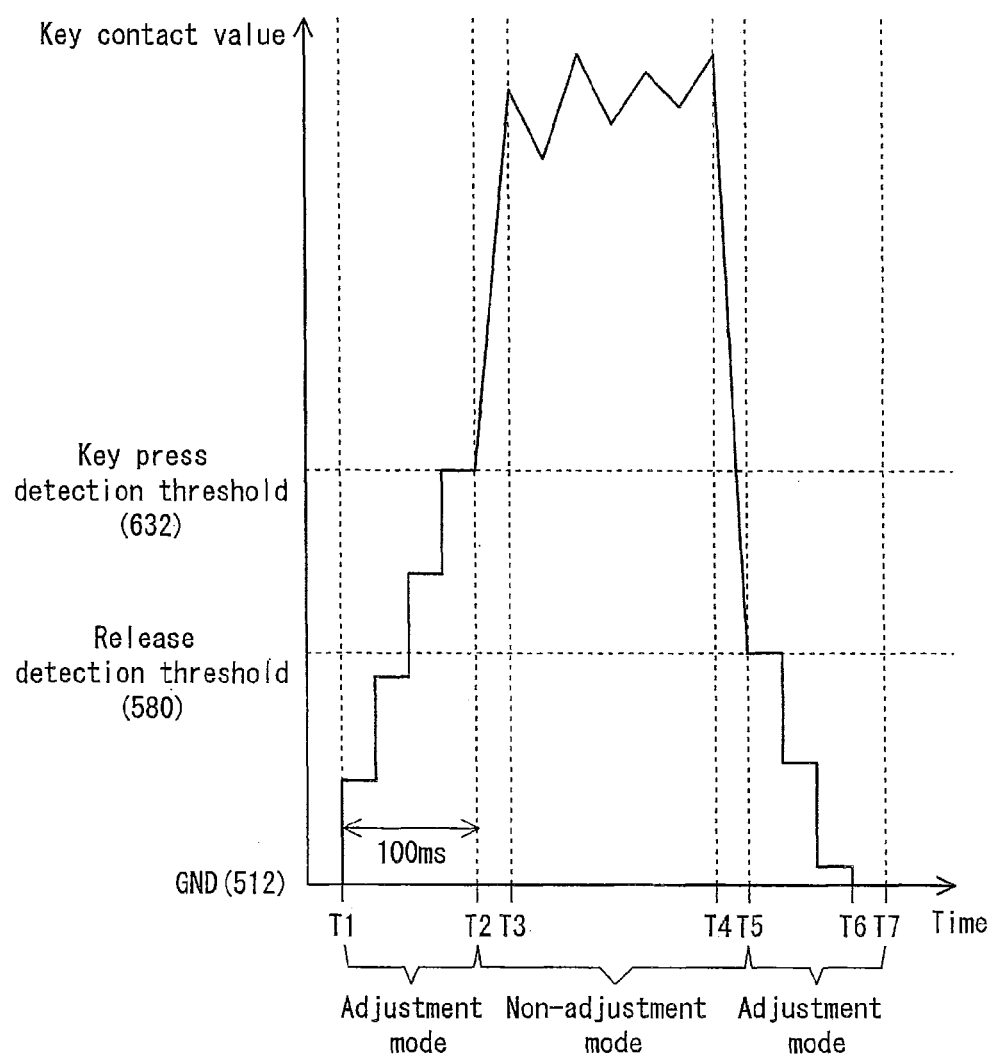
FIG. 5 illustrates the changes observed in a key contact value calculated by a calculation unit 111.

FIG. 5 illustrates changes observed in a key contact value calculated by the calculation unit 111.

In FIG. 5, the horizontal axis indicates time, whereas the vertical axis indicates a key contact value of a specific key which has been contacted by a user's finger or the like. Note that FIG. 5 does not illustrate the change of the key contact value when the key contact value is between 0-511. Further, the GND level (set to "512", for example) illustrated in FIG. 5 is a threshold for judging whether a key is in contact with the user's finger or the like.

In addition, in the following description, it is presumed that the interval between times T1 and T2 in FIG. 5 and the interval between times T5 and T7 in FIG. 5 are commonly 100 ms. Further, it is presumed that the calculation unit 111 is in adjustment mode at time T1.

Time T1 indicates a timing at which contact to a certain key by a user's finger or the like is started.

When contact is made to the key, the value which increases/decreases according to the increase/decrease of contact area within the coordinate area corresponding to the key exceeds the key press detection threshold. However, since the calculation unit 111 is in adjustment mode between times T1 and T2, the calculation unit 111 performs adjustment to the value associated with the key, and sets the adjusted value as the key contact value. More specifically, the key contact value calculated is a value having been adjusted such that the change thereof during the unit interval (25 ms, in this example) is within a predetermined value (set to "30", in this example). Hence, the key contact value of the key increases in a staircase-like manner between times T1 and T2.

Time T2 indicates a timing at which the key contact value of the key equals or exceeds the key press detection threshold.

Since the switching unit 112 is configured to cause the calculation unit 111 to switch to non-adjustment mode when the key contact value equals or exceeds the key press detection threshold, the calculation unit 111 is switched to non-adjustment mode at time T2. As a result, from this point, the calculation unit 111 sets the value which increases/decreases according to the increase/decrease of contact area within the coordinate area corresponding to the contacted key as the key contact value without performing adjustment thereto, and thus, the key contact value increases rapidly between times T2 and T3. Following this, and until time T5, the key contact value changes according to the increase/decrease in the area to which contact is made within the coordinate area of the touchpad 102 corresponding to the key.

Time T4 indicates a timing at which the contact to the key by the user's finger or the like is released. As mentioned above, the contact to the key by the user's finger or the like has been started at time T1.

Since the calculation unit 111 is still in non-adjustment mode between times T4 and T5, the key contact value decreases rapidly.

Time T5 indicates a timing at which the key contact value equals or falls below the release detection threshold.

Since the switching unit 112 is configured to cause the calculation unit 111 to switch to adjustment mode when the key contact value falls below or equals the release detection threshold, the calculation unit 111 is switched to adjustment mode at time T5. As a result, the calculation unit 111 performs adjustment to the value which increases/decreases according to the increase/decrease of contact area within the coordinate area corresponding to the key, and sets the adjusted value as the key contact value. More specifically, the key contact value calculated is a value having been adjusted such that the change thereof during the unit interval (25 ms) is within a predetermined value (30). Hence, the key contact value of the key decreases in a staircase-like manner between times T5 and T6.

By causing the calculation unit 111 to switch between the two modes as described above, the risk of processing allocated to keys other than the key whose processing the user intended to execute being performed (erroneous operation) is reduced in the mobile phone 100. At the same time, such a configuration makes it possible for the mobile phone 100 to respond quickly to continuous key operations performed by the user.

In the following, the effects yielded by configuring the calculation unit 111 to switch between the two modes thereof are described in further detail.

As description has already been made in the above, a key contact value is calculated by the calculation unit 111 based on the at least one electrostatic capacity value which is output from the touchpad 102. Here, it should be noted that the electrostatic capacity value also changes when affected by noises. Such noises are generated when phone calls are made, or photographs are taken utilizing a camera function provided to a conventional mobile phone.

Further, as described in the above, the key determination unit 113 determines a key having a key contact value equal to or greater than the key press detection threshold (632) as the target key, and the mobile phone 100 executes the processing allocated to the determined target key. Such being the case, the change of key contact values occurring due to noise is problematic. That is, in a case where key contact values suddenly exceed the key press detection threshold by being affected by noise, there is a risk of erroneous operation.

However, such erroneous operation is appropriately prevented by the structure of the present embodiment. As already mentioned in the above, the calculation unit 111 operates in adjustment mode between time T1 being the timing at which contact to the key is started and time T2 being the timing at which the key contact value of the contacted key equals or exceeds the key press detection threshold. Therefore, the calculation unit 111 outputs, as the key contact value, a value which has been adjusted such that the change thereof during the unit interval is within the predetermined value (30). Hence, a case is appropriately prevented where the key contact values suddenly exceed the key press detection threshold due to being affected by noise, and accordingly, the occurrence of erroneous operation as mentioned above is prevented.

In addition, and as already has been mentioned in the above, once a target key has been determined, the key determination unit 113 does not perform the determination of a subsequent target key until contact being made to all of the keys is released and the key contact values of all keys on the touchpad 102 have fallen below or equal to the release detection threshold. As such, the calculation unit 111 operates in non-adjustment mode between times T2 and T5. Thus, when the user's finger or the like is released at time T4, the key contact value of the contacted key decreases rapidly, until the key contact value equals the release detection threshold at time T5 in FIG. 5.

Thus, for example, if supposing that the key corresponding to the key contact value illustrated in FIG. 5 is the only key contacted by the user's finger or the like, the determination of a subsequent target key will be made possible after time T5. Therefore, when compared to a case where the calculation unit 111 operates in adjustment mode between times T2 and T5, the mobile phone is able to respond with an enhanced level of quickness to continuous key operations by the user.

<Operation>

In the following, description is provided on the operation of the mobile phone 100 having the aforementioned structure, with reference to the accompanying FIG. 6.

Figure 6:
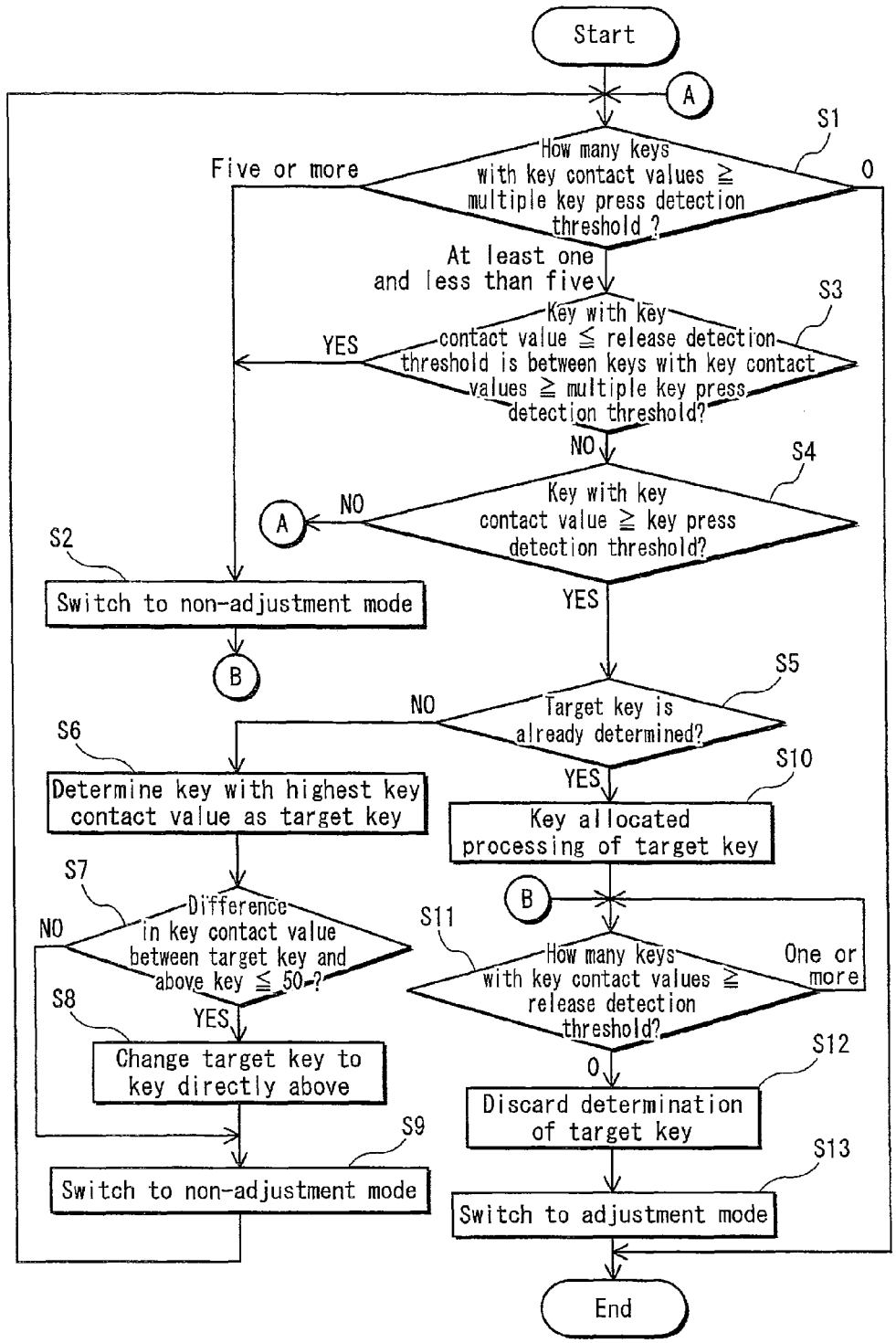
FIG. 6 is a flowchart illustrating control processing performed by the mobile phone 100 in response to input from a touchpad 102.
Figure 7A:
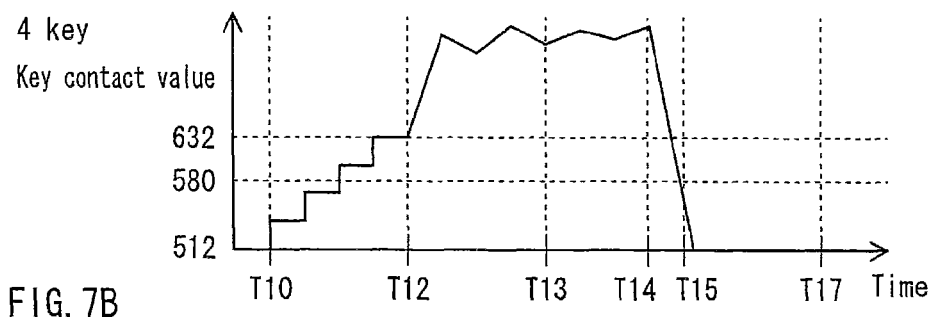
FIGS. 7A to 7E illustrate examples of the changes observed in key contact values of the 4, 5, 1, 2, and 7 keys, respectively.
Figure 7B:
Figure 7C:
Figure 7D:
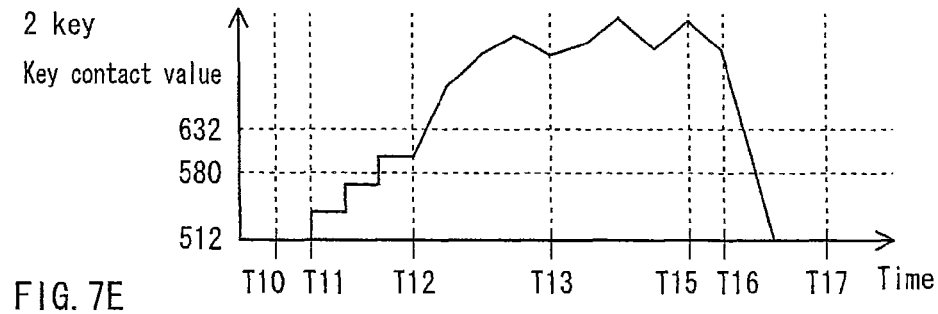
Figure 7E:
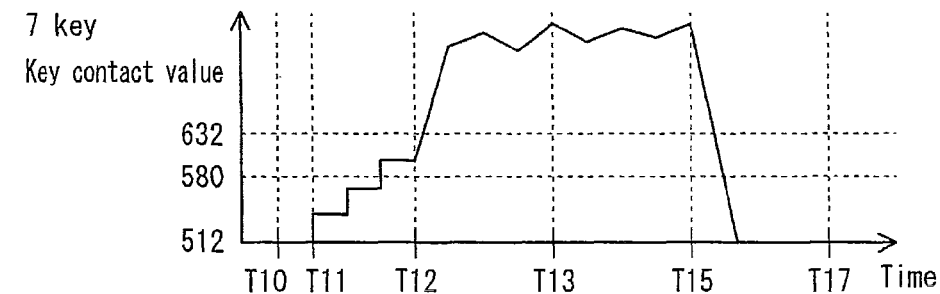
Figure 8A:
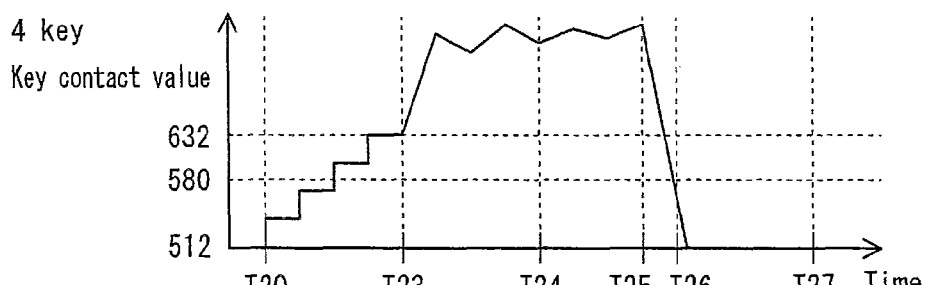
FIGS. 8A to 8E illustrate examples of the changes observed in key contact values of the 4, 5, 1, 7, and 8 keys, respectively.
Figure 8B:
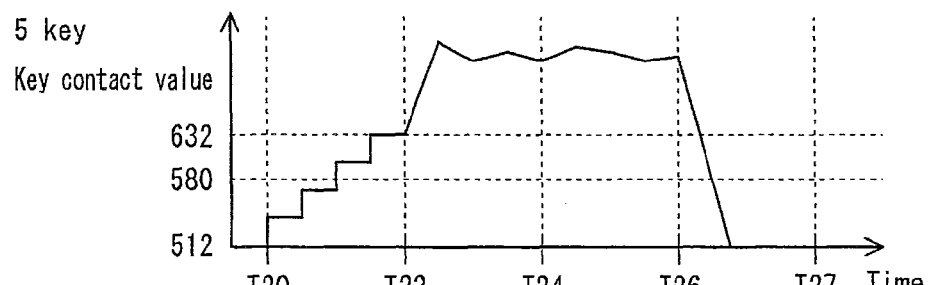
Figure 8C:
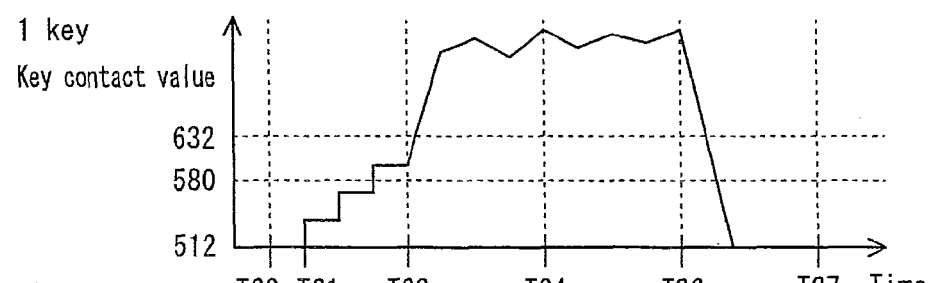
Figure 8D:
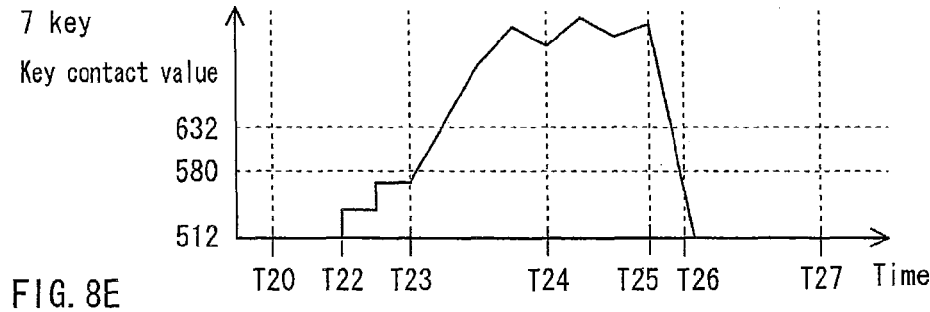
Figure 8E:
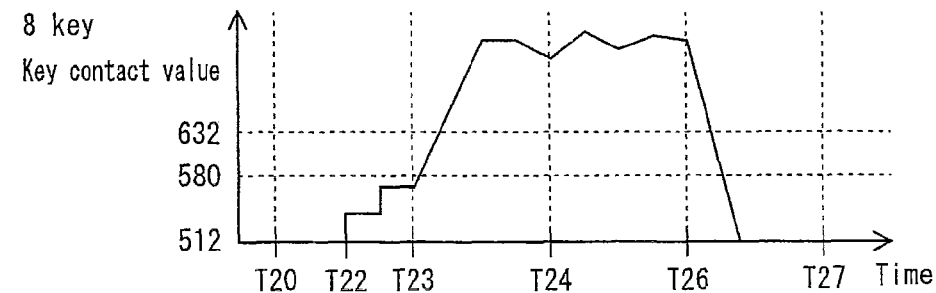

FIG. 6 is a flowchart illustrating control processing performed by the mobile phone 100 in response to input from the touchpad 102.

Note that, separately from the control processing shown in FIG. 6, the touchpad 102 outputs at least one pair of values that each consist of a coordinate value (x, y) indicating a position on the touchpad 102 to which contact is made and a value indicating the electrostatic capacity of the contacted position, every time a unit interval (25 [ms] in this example) elapses. A key contact value is calculated by the calculation unit 111 of the control unit 110 for each key to which contact is being made, every time a unit interval elapses. Additionally, the following description is made under the presumption that the calculation unit 111 is initially in adjustment mode.

In addition, the control processing shown in FIG. 6 is repeatedly performed.

As illustrated in FIG. 6, the key determination unit 113 of the control unit 110 determines the number of keys having key contact values equal to or greater than the multiple key press detection threshold repeatedly (every 100 ms, in this example) (Step S1). The judgment is made based on the latest key contact values of each of the keys calculated by the calculation unit 111.

When none of the keys has a key contact value equal to or greater than the multiple key press detection threshold (Step S1: zero), the key determination unit 113 terminates the control processing without performing any processing.

When there are five or more keys having key contact values equal to or greater than the multiple key press detection threshold (Step S1: five or more), the switching unit 112 causes the calculation unit 111 to switch to non-adjustment mode (Step S2), and the processing proceeds to the later-described Step S11.

In Step S2, the calculation unit 111 is caused to switch to non-adjustment mode to allow the determination of the next target key to be performed as quickly as possible. More specifically, when multiple key press is detected, the calculation unit enters non-adjustment mode from adjustment mode as described above. Thus, when the contact made to the keys is released, the key contact values of all of the keys to which contact had been made rapidly falls below the key press detection threshold.

Further, the processing proceeds to Step S11 to prevent the execution of a later-described key allocated processing of Step S10 (erroneous operation). Such configuration is made in view of cases of multiple key press, where it is assumed that the contact made to the touchpad 102 is not a result of a normal user operation performed by the user by using his/her fingers or the like, and thus there is a need of preventing the key allocated processing from being executed.

In Step S1, when there are one to four keys having key contact values equal to or greater than the multiple key press detection threshold (Step S1: at least one and less than five), the key determination unit 113 judges whether there is a key (i) which is positioned between, that is, commonly adjacent to a combination of two of the one to four keys having key contact values equal to or greater than the multiple key press detection threshold, and (ii) which has a key contact value which is smaller than or equal to the release detection threshold (Step S3). This judgment is performed with respect to all combinations of two of one to four keys having key contact values equal to or greater than the multiple key press detection threshold. When it is judged that there is such a key, it is assumed that the contact to the keys has not resulted from a normal user operation made by the user with use of his/her finger or the like. Such configuration is made since there is a need of preventing the execution of key allocated processing in such a case (erroneous operation).

In addition, the above judgment of Step S5 can be performed with respect to two keys which have key contact values equal to or greater than the multiple key press detection threshold and which, however, do not belong to the same horizontal row or the same vertical row. For example, supposing that when the 1 key and the 8 key have key contact values equal to or greater than the multiple key press detection threshold, the key determination unit 113 determines, as a key commonly adjacent to both the 1 key and the 8 key, a key (i) which is located in the horizontal row in between the horizontal rows in which the 1 key and the 8 key are located, and (ii) which is, at the same time, located in the vertical rows including and in between the vertical rows in which the 1 key and the 8 key are located (the 4 key and the 5 key, in this example).

Similarly, when four keys, namely the 1 key, the 3 key, the 4 key, and the 6 key, have key contact values equal to or greater than the multiple key press detection threshold, the key determination unit 113 determines, as keys commonly adjacent to two of the four keys, the 2 key and the 5 key, and further judges whether at least one of the 2 key and the 5 key has a key contact value which is smaller than or equal to the release detection threshold. A positive judgment is made (Step S3: YES) when at least one of the 2 key and the 5 key, in this example, has a key contact value smaller than or equal to the release detection threshold, while, on the other hand, a negative judgment is made (Step S3: NO) when both the 2 key and the 5 key have key contact values greater than the release detection threshold.

In the judgment of Step S3, when there is no key commonly adjacent to combinations of two of the less than five keys having key contact values equal to or greater than the multiple key press detection threshold, the key determination unit 113 makes a negative judgment (Step S3: NO). One example is when the 1 key and the 2 key have key contact values equal to or greater than the multiple key press detection threshold. Since there is no key commonly adjacent to the 1 key and the 2 key, the key determination unit 113 makes a negative judgment.

In a case where there is a key (i) which is commonly adjacent to a combination of two keys having key contact values equal to or greater than the multiple key press detection threshold and (ii) which has a key contact value smaller than or equal to the release detection threshold (Step S3: YES), the switching unit 112 causes the calculation unit 111 to switch to non-adjustment mode from adjustment mode (Step S2), and processing proceeds to the later-described Step S11. In contrast, when there are one or more keys adjacent to combinations of two keys having key contact values equal to or greater than the multiple key press detection threshold, but however, the one or more keys have key contact values greater than the release detection threshold (Step S3: NO), the key determination unit 113 judges whether there is a key having a key contact value equal to or greater than the key press detection threshold among the keys having key contact values equal to or greater than the multiple key press detection threshold. Note that the keys having key contact values equal to or greater than the multiple key press detection threshold have been preemptively detected in Step S1 (Step S4).

When none of the keys has a key contact value equal to or greater than the key press detection threshold (Step S4: NO), the processing restarts from Step S1. When there is key having a key contact value equal to or greater than the key press detection threshold (Step S4: YES), the key determination unit 113 subsequently judges whether the target key has been already determined (Step S5).

When the target key has not yet been determined (Step S5: NO), the key determination unit 113 determines the key having the highest key contact value, among the keys having key contact values equal to or greater than the key press detection threshold, as the target key (Step S6). In a case where two or more keys have the same highest key contact value, the target key is determined according to a predetermined order of priority of the keys. In this example, description is made under the presumption that keys which are located closer to the upper left edge of the touchpad are given a higher priority. For instance, when three keys, namely the 1 key, the 2 key and the 4 key, have the same highest key contact value, the 1 key is determined as the target key.

In addition to this, the key determination unit 113 judges whether a value obtained by subtracting, from the key contact value of the target key, a key contact value of a key located directly above the target key is smaller than or equal to a predetermined value (set to "50", in this example) (Step S7). When the value obtained in Step S7 is greater than the predetermined value (Step S7: NO), the switching unit 112 causes the calculation unit 111 to switch to non-adjustment mode from adjustment mode (Step S9), and processing restarts from Step S1.

When the value obtained by subtracting a key contact value of a key located directly above the target key from the key contact value of the target key is smaller than or equal to the predetermined value (Step S7: YES), the key determination unit 113 replaces the previous target key (the key having the highest key contact value) with a new target key which is the key directly above the previous target key (Step S8). Further, the switching unit 112 causes the calculation unit 111 to switch to non-adjustment mode from adjustment mode (Step S9), and processing restarts from Step S1.

The processing of Step S8 is incorporated as a countermeasure for such a case as where a pad of a finger, for example, contacts a key directly below the key which the user intended to press. In such a case, the key directly below the intended key will have the highest key contact value, which is problematic. Thus, in Step S8, when the value obtained by subtracting, from the highest key contact value, the key contact value of the key directly above the key having the highest key contact value is smaller than or equal to the predetermined value (50, in this example), it is determined that the key which the user actually intended to contact is the key directly above the key having the highest key contact value. Therefore, the key directly above the key having the highest key contact value is newly determined as the target key.

On the other hand, when it is judged that the target key has already been determined (Step S5: YES) in Step S5, the event notification unit 114 notifies the application execution unit 120 of a key press event. The application execution unit 120 executes processing allocated to the target key (key allocated processing) based on the event notified (Step S10).

Here, the key press event is an event indicating that a key has been pressed, and includes information identifying the target key which is the key having been pressed.

In execution of the key allocated processing, the application execution unit 120 instructs the display control unit 116 of the control unit 110 to display, on the sub LCD 101, a number or the like indicating the target key identified by the information included in the key press event. Upon receiving the instruction, the display control unit 116 causes the sub LCD 101 to display a number or the like indicating the target key. The "number or the like indicating the target key" as referred to in the above includes a number or a symbol assigned to a target key, and for example, if the 1 key is the target key, "1" is displayed on the sub LCD 101, whereas if the star key (*) is the target key, "*" is displayed on the sub LCD 101.

Subsequently, the key determination unit 113 determines the number of keys having key contact values equal to or greater than the release detection threshold (Step S11). The judgment here is made based on the latest key contact values each of which have been calculated by the calculation unit 111.

When one or more keys have key contact values equal to or greater than the release detection threshold (Step S11: one or more), the judgment of Step S11 is performed repeatedly (every 100 ms, in this example). When none of the keys has a key contact value equal to or greater than the release detection threshold (Step S11: zero), the key determination unit 113 discards the determination of the target key (Step S12), and the switching unit 112 causes the calculation unit 111 to switch to adjustment mode from non-adjustment mode (Step S13), and the control processing terminates.

<Explanation of Operation Based on Examples>

In the following, description is made on the operation of the above-described mobile phone 100, based on examples.

<Multiple Key Press before Determination of Target Key>

Description is made in the following of an example of the operation of the mobile phone 100 in a case where multiple key press has been detected before determination of the target key.

FIGS. 7A to 7E illustrate examples of the changes observed in key contact values of the 4, 5, 1, 2, and 7 keys, respectively.

In the following examples, at time T10, contact to each of the 4, 5, and 1 keys is started. At time T11, contact to each of the 2 and 7 keys is started. At time T14, the contact to the 4 key is released. At time T15, the contact to each of the 5, 1, and 7 keys is released. At time T16, the contact to the 2 key is released.

In addition, in FIGS. 7A to 7E it is presumed that the interval between times T10 and T12, the interval between times T12 and T13, the interval between times T13 and T15, and the interval between times T15 and T17 are commonly 100 ms.

Furthermore, in FIGS. 7A to 7E, the values "512", "580", and "632" in the vertical axis denote the value of GND, the value of release detection threshold and multiple key press detection threshold, and the value of key press detection threshold, respectively. Note that the range of the values of 0-511 is not depicted. The time having the same sign in the horizontal axis denotes the same time. The same applies to the explanation of FIGS. 8A to 8E and FIGS. 9A to 9B, which is later provided.

At time T10 in FIGS. 7A to 7E, the key determination unit 113 starts control processing. However, at this time, since none of the keys has a key contact value equal to or greater than the multiple key press detection threshold (580) (S1: zero in FIG. 6), the key determination unit 113 terminates the control processing, without performing any processing.

At time T12 in FIGS. 7A to 7E, the key determination unit 113 restarts control processing, and performs judgment of Step S1 in FIG. 6. In this example, since five keys (the 4, 5, 1, 2, and 7 keys) have key contact values equal to or greater than the multiple key press detection threshold (Step S1: five or more), the switching unit 112 causes the calculation unit 111 to switch to non-adjustment mode from adjustment mode (Step S2).

At time T13 in FIGS. 7A to 7E, the key determination unit 113 determines the number of keys having key contact values equal to or greater than the release detection threshold, based on the latest key contact values each of which have been calculated by the calculation unit 111 (Step S11 in FIG. 6). Since five keys (the 4, 5, 1, 2, and 7 keys) have key contact values equal to or greater than the release detection threshold (Step S11: one or more), the key determination unit 113 returns to the processing of Step S11.

Also, at time T15 in FIGS. 7A to 7E, since four keys (the 5, 1, 2, and 7 keys) have key contact values equal to or greater than the release detection threshold (Step S11: one or more in FIG. 6), the key determination unit 113 again returns to the processing of Step S11.

At time T17 in FIGS. 7A to 7E, since none of the keys has key contact values equal to or greater than the release detection threshold (Step S11: zero), the key determination unit 113 discards the determination of the target key (Step S12), and the switching unit 112 causes the calculation unit 111 to switch to adjustment mode from non-adjustment mode (Step S13), and the control processing terminates.

According to the mobile phone 100 as described above, before the target key is determined (at time T12, in this example), it is possible to detect multiple key press of keys including keys having key contact values equal to or greater than the multiple key press detection threshold and less than the key press detection threshold (the 2 and 7 keys, in this example). Therefore, even in the case where the user's ear, face, or the like contacts the touchpad 102 during a call, it is possible to appropriately prevent an erroneous operation. Such an erroneous operation is, for example, a case where a key, which has the greatest key contact value among keys having key contact values equal to or greater than the multiple key press detection threshold, is determined as a target key, and as a result key allocated processing of the determined target key is erroneously performed.

<Multiple Key Press after Determination of Target Key>

Description is made in the following of an example of the operation of the mobile phone 100 in a case where multiple key press has been detected after determination of the target key.

FIGS. 8A to 8E illustrate examples of the changes observed in key contact values of the 4, 5, 1, 7, 8 keys, respectively.

In the following examples, at time T20, contact to each of the 4 and 5 keys is started. At time T21, contact to the 1 key is started. At time T22, contact to each of the 7 and 8 keys is started. At time T25, the contact to each of the 4 and 7 keys is released. At time T26, the contact to each of the 5, 1, and 8 keys is released.

In addition, it is presumed that the interval between times T20 and T23, the interval between times T23 and T24, the interval between times T24 and T26, and the interval between times T26 and T27 are commonly 100 ms.

At time T20 in FIGS. 8A to 8E, the key determination unit 113 starts control processing. However, at this time, since none of the keys has a key contact value equal to or greater than the multiple key press detection threshold (580) (S1: zero in FIG. 6), the key determination unit 113 terminates the control processing, without performing any processing.

At time T23 in FIGS. 8A to 8E, the key determination unit 113 restarts control processing, and performs judgment of Step S1 in FIG. 6. In this example, three keys (the 4, 5, and 1 keys) has key contact values equal to or greater than the multiple key press detection threshold (580) (Step S1: at least one and less than five), no key is commonly adjacent to the 1 and 4 keys, no key is commonly adjacent to the 1 and 5 keys, and no key is commonly adjacent to the 4 and 5 keys. Accordingly, the key determination unit 113 judges that a key commonly adjacent to a combination of two keys has a key contact value greater than the release detection threshold (Step S3: NO).

Also, the keys, which have key contact values equal to or greater than the multiple key press detection threshold detected in Step S1, include keys (the 4 and 5 keys) having key contact value equal to or greater than the key press detection threshold (Step S4: YES), and the target key has not yet been determined (Step S5: NO). In this example, since the 4 and 5 keys each have the maximum key contact value of 632, the key determination unit 113 determines the 4 key, which is located more left than the 5 key, as the target key, according to the predetermined order of priority of the keys (Step S6).

Also, when a value (24) obtained by subtracting a key contact value (608) of a key (the 1 key) located directly above the target key from the key contact value (632) of the target key (the 4 key) is smaller than or equal to the predetermined value (50) (Step S7: YES), the key determination unit 113 replaces the previous target key (the 4 key) with a new target key which is the key (the 1 key) directly above the previous target key (Step S8). Further, the switching unit 112 causes the calculation unit 111 to switch to non-adjustment mode from adjustment mode (Step S9), and processing restarts from Step S1.

At time T24 in FIGS. 8A to 8E, the key determination unit 113 performs judgment of Step S1 in FIG. 6. In this example, since five keys (the 4, 5, 1, 7, and 8 keys) have key contact values equal to or greater than the multiple key press detection threshold (580) (Step S1: five or more), the switching unit 112 causes the calculation unit 111 to switch to non-adjustment mode (Step S2).

At time T26 in FIGS. 8A to 8E, the key determination unit 113 determines the number of keys having key contact values equal to or greater than the release detection threshold, based on the latest key contact values each of which have been calculated by the calculation unit 111 (Step S11 in FIG. 6). Since three keys (the 5, 1, and 8 keys) have key contact values equal to or greater than the release detection threshold (Step S11: one or more), the key determination unit 113 again returns to the processing of Step S11.

At time T27 in FIGS. 8A to 8E, since none of the keys has key contact values equal to or greater than the release detection threshold (Step S11: zero in FIG. 6), the key determination unit 113 discards the determination of the target key (the 1 key, in this example) (Step S12), and the switching unit 112 causes the calculation unit 111 to switch to adjustment mode from non-adjustment mode (Step S13), and the control processing terminates.

According to the mobile phone 100 as described above, even in the case where multiple key press is not detected at a timing at which a key whose key contact value exceeds the multiple key press detection threshold (at time T23, in this example), judgment is again made as to whether multiple key press has been detected after a target key has been determined (at time T24, in this example). Therefore, by detecting multiple key press at this timing after the determination of the target key, it is possible to appropriately prevent an erroneous operation.

<Case where Key Having Key Contact Value Smaller than or Equal to Release Detection Threshold is Between Keys Having Key Contact Values Equal to or Greater than Multiple Key Press Detection Threshold>

Description is made in the following of an example of the operation of the mobile phone 100 in a case where a key, which is commonly adjacent to a combination of each two keys having key contact values equal to or greater than the multiple key press detection threshold, has a key contact value smaller than or equal to the release detection threshold.

Figure 9A:
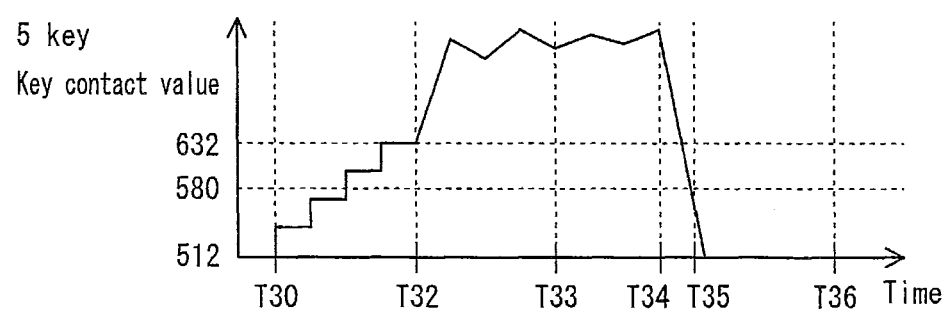
FIGS. 9A and 9B illustrate examples of the changes observed in key contact values of the 5 and 0 keys, respectively.
Figure 9B:
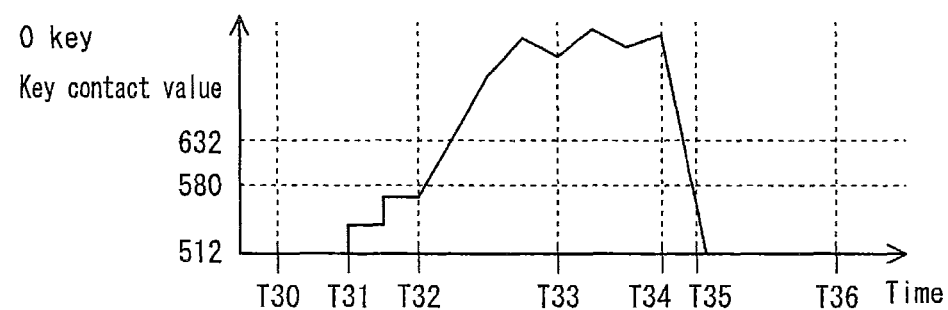

FIGS. 9A and 9B illustrate examples of the changes observed in key contact values of the 5 and 0 keys, respectively.

In the following examples, at time T30, contact to the 5 key is started. At time T31, contact to the 0 key is started. At time T34, the contact to each of the 5 and 0 keys is released. In the interval between times T30 and T36, the 2 and 8 keys have key contact values smaller than or equal to the release detection threshold.

In addition, it is presumed that the interval between times T30 and T32, the interval between times T32 and T33, the interval between times T33 and T35, and the interval between times T35 and T36 are commonly 100 ms.

At time T30 in FIGS. 9A and 9B, the key determination unit 113 starts control processing. However, at this time, since none of the keys has a key contact value equal to or greater than the multiple key press detection threshold (580) (S1: zero in FIG. 6), the key determination unit 113 terminates the control processing, without performing any processing.

At time T32 in FIGS. 9A and 9B, the key determination unit 113 restarts control processing, and performs judgment of Step S1 in FIG. 6. In this example, one key (the 5 key) has a key contact value equal to or greater than the multiple key press detection threshold (580) (Step S1: at least one and less than five), and no key is commonly adjacent to the 5 key. Accordingly, the key determination unit 113 judges that a key commonly adjacent to a combination of two keys has a key contact value greater than the release detection threshold (Step S3: NO).

Also, the keys, which have key contact values equal to or greater than the multiple key press detection threshold detected in Step S1, include a key (the 5 key) having a key contact value equal to or greater than the key press detection threshold (Step S4: YES), and the target key has not yet been determined (Step S5: NO). Then, the key determination unit 113 determines the 5 key as the target key (Step S6).

Also, when a value obtained by subtracting a key contact value of a key (the 2 key) located directly above the target key from the key contact value (632) of the target key (the 5 key) is greater than the predetermined value (50) (Step S7: NO), the switching unit 112 causes the calculation unit 111 to switch to non-adjustment mode from adjustment mode (Step S9), and processing restarts from Step S1.

At time T33 in FIGS. 9A and 9B, the key determination unit 113 performs judgment of Step S1 in FIG. 6. In this example, two keys (the 5 and 0 keys) have key contact values equal to or greater than the multiple key press detection threshold (580) (Step S1: at least one and less than five), and the 8 key, which is commonly adjacent to the 5 and 0 keys, has a key contact value equal to or smaller than the release detection threshold (Step S3: YES). Accordingly, the switching unit 112 causes the calculation unit 111 to switch to non-adjustment mode from adjustment mode (Step S2).

At time T35 in FIGS. 9A and 9B, the key determination unit 113 determines the number of keys having key contact values equal to or greater than the release detection threshold, based on the latest key contact values each of which have been calculated by the calculation unit 111 (Step S11 in FIG. 6). Since none of the keys has a key contact value equal to or greater than the release detection threshold (Step S11: zero), the key determination unit 113 discards the determination of the target key (the 5 key, in this example) (Step S12), and the switching unit 112 causes the calculation unit 111 to switch to adjustment mode from non-adjustment mode (Step S13), and the control processing terminates.

According to the mobile phone 100 as described above, even in the case where the number of keys, which have key contact values equal to or greater than the multiple press detection threshold, is less than the value that is the number of keys where multi key press is to be detected (five, in this example), it is possible to appropriately prevent an erroneous operation. This is made possible by detecting erroneous contact, which includes multiple key press and another state of contact where a key contact value of a key which is commonly adjacent to two keys having key contact values equal to or greater than the multiple key press detection threshold is smaller than or equal to the release detection threshold. Such states of contact are unlikely to take place when the user is performing a normal user operation by using his/her finger or the like.

The description has been made of the example where, at time T33, the key determination unit 113 detects that the key (the 8 key), which is commonly adjacent to the combination of the two keys (the 5 and 0 keys) having key contact values equal to or greater than the multiple key detection threshold, has a key contact value equal to or smaller than the release detection threshold. Also, even in the case where the contact to the 0 key is started before time T31 and the 0 key has a key contact value equal to or greater than the multiple key press threshold (580) at time T32, the determination unit 113 detects at time T32 that the 8 key has a key contact value equal to or less than the release detection threshold. Accordingly, erroneous operation can be similarly prevented.

<Modification>

In the following, description is provided on another method for detecting a case where contact made to the touchpad 102 is not a result of a normal user operation performed by the user by using his/her finger or the like in order to prevent an erroneous operation. The following method differs from the method according to Step S3 in FIG. 6, where such contact is detected by determining that there is a key (i) which is commonly adjacent to a combination of two keys having key contact values equal to or greater than the multiple key press detection threshold, and (ii) which has a key contact value which is smaller than or equal to the release detection threshold.

A mobile phone pertaining to a modification (referred to also as a "modified mobile phone" hereinafter) is obtained by modifying the functions of the key determination unit 113 of the mobile phone 100 so as to provide a slightly different function thereto. Therefore, description is provided hereafter focusing on the differences between the mobile phone 100 and the modified mobile phone.

<Operation>

In the following, description is made on the operation of the modified mobile phone, with reference to the accompanying FIG. 10.

FIG. 10 is a flowchart illustrating control processing performed by the modified mobile phone in response to input from the touchpad 102.

As illustrated in FIG. 10, the control processing of the modified mobile phone differs from that of the mobile phone 100 pertaining to embodiment 1 in that processing of Step S3 in FIG. 6 is not included, whereas processing of Steps S14 and S15 in FIG. 6 is incorporated. Therefore, description is provided hereafter focusing on the differences.

The key determination unit of the modified mobile phone (referred to also as a "modified key determination unit" hereinafter) determines how many keys have key contact values equal to or greater than the multiple key press detection threshold (Step S1). The determination is performed based on the latest key contact values of each of the keys calculated by the calculation unit 111. When it is determined that one to four keys have key contact values equal to or greater than the multiple key press detection threshold (Step S1: at least one and less than five), the modified key determination unit judges whether there is a key having a key contact value equal to or greater than the key press detection threshold among the keys having key contact values greater than the multiple key press detection threshold. The keys having key contact values greater than the multiple key press detection threshold have been determined in Step S1 (Step S4).

When there is a key having a key contact value equal to or greater than the key press detection threshold (Step S4: YES), the modified key determination unit judges whether a target key has already been determined (Step S5). When the target key has not yet been determined (Step S5: NO), the modified key determination unit determines the key having the greatest key contact value, among the keys having key contact values equal to or greater than the key press detection threshold, as the target key (Step S6).

Subsequently, the modified key determination unit judges whether one or more of the keys (referred to hereinafter as "specific keys") of the touchpad 102 excluding (i) the keys adjacent to the target key and (ii) the key located two keys below the target key in the vertical row, have key contact values equal to or greater than the multiple key press detection threshold (Step S14). For instance, when the 5 key is the target key, the specific keys are keys of the touchpad 102 excluding keys 1-4, keys 6-9, and the 0 key. Similarly, when the 4 key is the target key, the specific keys are keys of the touchpad 102 excluding keys 1, 2, 5, 7, 8, and the star key (*).

When one or more of the specific keys have key contact values equal to or greater than the multiple key press detection threshold (Step S14: YES), the modified key determination unit proceeds to the processing of Step S11. This is because when the user makes key operations on the touchpad 102 by using his/her finger or the like, simultaneous contact cannot be made to a target key and a specific key, under the presumption that when the user makes key operations on the touchpad 102 by using his/her finger or the like, the maximum number of keys which may be simultaneously contacted is four. Further, the reason why the key located two keys below the target key in the vertical row is not included in the specific keys is because there is a possibility of the finger pad falling into contact with the key located two keys below the target key, even in a case where the user is controlling the keys of the touchpad using his/her finger or the like.

When all of the one or more specific keys have key contact values smaller than the multiple key press detection threshold (Step S14: NO), the modified key determination unit judges whether a value obtained by subtracting, from the key contact value of the target key, a key contact value of a key located directly above the target key is smaller than or equal to a predetermined value (50) (Step S7). This judgment is similar to one explained with regards to FIG. 6. The modified key determination unit performs processing of Step S8 based on the result of the judgment. The switching unit 112 causes the calculation unit 111 to switch to non-adjustment mode from adjustment mode of Step S9. Subsequently, processing restarts from Step S1.

When it is judged that the target key has been already determined after Steps S1, S4, and S5 have been performed as in the above (Step S5: YES), the modified key determination unit judges whether one or more of the specific keys have key contact values equal to or greater than the multiple key press detection threshold (Step S15). Note that Step S15 is similar to the above-described Step S14.

The judgment as to whether one or more of specific keys have key contact values equal to or greater than the multiple key press detection threshold is performed once again in Step S15 since there are cases where contact to the specific keys occurs later than the contact to the target key.

When one or more of the specific keys have key contact values equal to or greater than the multiple key press detection threshold (Step S15: YES), the modified key determination unit proceeds to the processing of Step S11 without performing any processing. When all of the one or more specific keys have key contact values smaller than the multiple key press detection threshold (Step S15: NO), the application execution unit 120 executes key allocated processing of the target key, based on a key press event notified from the event notification unit 114 (Step S10), as explained in embodiment 1.

The modified key determination unit determines the number of keys having key contact values equal to or greater than the release detection threshold (Step S11). The judgment is performed based on the latest key contact values of each of the keys calculated by the calculation unit 111. When none of the keys has a key contact value equal to or greater than the release detection threshold (Step S11: zero), the modified key determination unit discards the determination of the target key (Step S12), and the switching unit 112 causes the calculation unit 111 to switch to adjustment mode from non-adjustment mode (Step S13). Then, the control processing terminates.

<Supplement>

Although description has been made in the above on the portable terminal pertaining to the present invention with focus on embodiment 1 and modification thereof (referred to hereinafter simply as "embodiment"), it is to be understood that the present invention is not limited to the portable terminal as description has been made in the embodiment, and modifications as introduced below can be made without departing from the spirit and scope thereof.

(1) Although explanation has been made in the above presuming that the mobile phone pertaining to the embodiment is a flip-type mobile phone which opens in a horizontal direction with respect to the longitudinal direction thereof, the present invention is not limited to this. The mobile phone may be a flip-type mobile phone which opens in a vertical direction with respect to the longitudinal direction thereof, a bar-type mobile phone, a slider-type mobile, or mobile phones having other exterior forms, as long as the mobile phone is equipped with a touchpad.

(2) Although explanation has been made in the above that the mobile phone pertaining to the embodiment is a mobile phone to which the sub LCD 101 and the touchpad 102 are separately provided as in the illustration of FIG. 3, the present invention is not limited to this. The mobile phone pertaining to the present invention may be provided with the sub LCD 101 and the touchpad 102 in an integrated state. That is, the mobile phone may include a so-called touch panel.

Further, in providing such a touch panel to the mobile phone pertaining to the present invention, the touch panel need not be embodied as a single touch panel having both a controller part for receiving user operations and a display part for displaying characters and the like resulting from the user operations. That is, the touch panel may be provided solely for receiving input of numbers, characters and the like from the user, and the display part for displaying input characters and the like may be separately embodied as an LCD, an organic light-emitting diode (Organic Electro-Luminescence) or the like.

Additionally, the touch panel need not be realized by using a display device such as an LCD for displaying images and the like. In other words, the touch panel need not display characters and the like. Alternatively, the touch panel may be embodied as a combination of an illumination unit and a sheet disposed above the illumination unit which has transparent portions formed in the shape of characters and marks. In such a case, the user may, for example, press areas of the sheet corresponding to transparent portions on which the shapes of predetermined characters have been formed, thereby bringing about a change in the electrostatic capacity of the touchpad. Thus, the predetermined character on the sheet is input to the touchpad.

(3) In the above, it has been explained that the touchpad 102 pertaining to the embodiment of the present invention is realized with use of a capacitive touch sensor. As such a capacitive touch sensor for realizing the touchpad 102, an appropriate type is to be selected from various types of capacitive touch sensors. Types of touch sensors include: a projected capacitance touch sensor which includes multiple electrode patterns formed on a substrate composed of plastic, glass or the like and which can detect contact made to locations thereof by measuring ratios of amperages between different electrode patterns in the vicinity of the contact location; a surface capacitance touch sensor which includes a conductive layer, a substrate, and electrodes provided to the edges of the substrate, in which a uniform electrostatic field is formed by the conductive layer, and the contact location is detected by measuring a ratio between the amperages of the electrodes caused by the contact made thereto by a finger or the like. Further, with regards to the touch panel as explanation has been made in the above modification (2), an appropriate touch panel may be similarly selected as necessary from various types of touch panels.

Further, although explanation has been provided in the embodiment that the touchpad 102 is embodied by use of a capacitive touch sensor, the present invention is not limited to this. Alternatively, the touchpad 102 may be embodied as an electromagnetic induction touch sensor, a matrix switch touch sensor, a resistive touch sensor, a surface acoustic wave touch sensor, an infrared touch sensor, an optical sensor touch sensor or the like. In further explanation of each of the types of the touch sensors, an electromagnetic induction touch sensor requires the use of a special pen such as an electronic pen, a matrix switch touch sensor is composed of transparent electrodes having two-layer structures, a resistive touch sensor includes two resistive layers and voltage is applied to one resistive layer and the other resistive layer detects changes in voltage according to locations on the one resistive layer to which contact has been made, a surface acoustic wave touch sensor detects contact made by a finger or the like by detecting the reflection of ultrasonic waves by monitoring the voltage changes of piezoelectric elements, an infrared touch sensor detects a location thereof to which contact has been made by a finger or the like by using shielded infrared beams, and an optical sensor touch sensor detects a location thereof to which contact has been made by using an optical sensor provided to the screen.

(4) In the embodiment, the value of the GND, the value of the release detection threshold or the multiple key press detection threshold, and the value of the key press detection threshold are set to "512", "580", and "632", respectively. However, such values have been provided for the mere sake of examples, and desirably, such values are to be determined as in the following.

As description has already been made in the above, a key contact value is calculated based on the electrostatic capacity value which is output from the touchpad 102. Therefore, it is preferable that the GND value be determined based on a preemptively-measured value indicating electrostatic capacity output from the touchpad 102 in a state where objects such as a user's finger is not in contact therewith.

Further, the electrostatic capacity value output from the touchpad 102 is subject to change even when contact is not actually being made to the touchpad 102. That is, there are cases where the electrostatic capacity value fluctuates due to noises being generated. The generation of such noises occurs by units of the mobile phone undergoing operation to perform functions allocated thereto. Such functions of the mobile phone include a telephone function, a camera function, and the like. Accordingly, it is preferable that the release detection threshold and the multiple key press detection threshold be determined by performing a preemptive measurement of the extent to which the electrostatic capacity value output from the touchpad 102 increases during the operation of such functions, and by setting the thresholds based on the result of the measurement.

Additionally, when contact is made to a key by a user's finger or the like, not only the key contact value of the contacted key changes but also the key contact values of keys which are adjacent to the contacted key but which have not actually been contacted are subject to change. In the embodiment, the difference between the value (580) of the release detection threshold or the multiple key press detection threshold, and the value (632) of the key press detection threshold is fixed to "52". However, the present invention is not limited to this, and it is desirable that the difference between the threshold values be determined based on a result of a preemptive measurement of the extent to which each of the electrostatic capacity value of the key to which contact is actually made and the electrostatic capacity value of the keys which are adjacent to the contacted key but which have not actually been contacted increases. It is preferable that the release detection threshold and the multiple key press detection threshold be determined based on the difference determined as such.

In addition, the release detection threshold and the multiple key press detection threshold are provided with a same value (580) in the embodiment. However, the two thresholds need not be provided with a same value, and the values of the release detection threshold and the multiple key press detection threshold may be set individually.

(5) In the embodiment, description is made under the presumption that, when the user makes key operations on the touchpad 102 by using his/her finger or the like, the maximum number of keys which may be simultaneously contacted is four. Hence, description has been made that multiple key press is detected when five or more keys are contacted. However, this is merely one example, and configuration may be made such that multiple key press is detected when a predetermined number of keys are contacted, provided that the predetermined number is set to two or more. Further, when the user makes key operations to the touchpad using his/her finger or the like, the maximum number of keys which can be simultaneously contacted may vary to a certain extent according to such reasons as the size of the user's finger or the like. Thus, configuration may be made such that multiple key press is detected when a predetermined number of keys are contacted simultaneously, the predetermined number of keys being set by having the user actually perform key operations at the beginning of the use of the mobile phone pertaining to the embodiment, and counting the maximum number of keys simultaneously contacted by the user. In addition, configuration may be also made such that the user is able to set the number of keys where multiple key press is to be detected.

(6) In Step S2 of FIG. 6 and Step S2 of FIG. 10, the state of the calculation unit 111 is caused to switch from adjustment mode to non-adjustment mode so that the determination of the subsequent target key can be performed as quickly as possible. More specifically, such prompt determination of the subsequent target key is made possible by the key contact values of the each of the keys quickly falling below the key press detection threshold when contact to the touchpad 102 has been released. However, the present invention is not limited to this, and the switching of the calculation unit from the adjustment mode to the non-adjustment mode need not be performed.

This is since, when Step S2 of FIG. 6 and Step S2 of FIG. 10 are executed, it can be assumed that contact is being made to the touchpad 102 by a user's face or the like, rather than by a user's finger or the like as in a normal user operation. In such cases, the necessity of realizing prompt execution of processing in response to subsequent key operation is comparatively low.

In addition, the processing of Step S2 of FIG. 6 and Step S2 of FIG. 10 may be executed only when the calculation unit 111 is in adjustment mode.

(7) In Step S7 of FIG. 6 and Step S7 of FIG. 10, the judgment is made as to whether the difference between the key contact value of the target key (a key having the highest key contact value) and the key contact value of the key directly above the target key is smaller than or equal to a predetermined value (50, in this example). However, the present invention is not limited to this, and, the same judgment may be performed using the key contact values of the keys located directly to the left and directly to the right of the target key, in addition to the key contact value of the key directly above the target key. In such a case, a calculation is to be performed for each of the key directly above the target key, the key directly to the right of the target key, and the key directly to the left of the target key, to obtain the difference between the key contact values of the target key and each of such keys. Subsequently, when at least one of the calculated differences is smaller than or equal to the predetermined value, the target key may be determined as the key having a key contact value the difference between which and the key contact value of the previous target key being the smallest.

In addition, the difference may be calculated between the key contact value of the target key and the key contact value of either one of the key directly to the left of the target key and the key directly to the right of the target key. Further, configuration may be also made such that the user is able to select the key used for the calculation of the difference from the key directly above the target key, the key directly to the left of the target key, and the key directly to the right of the target key.

(8) Further, in Step S7 of FIG. 6 and Step S7 of FIG. 10, judgment is made as to whether the difference between the key contact value of the target key (a key having the highest key contact value) and the key contact value of the key directly above the target key is smaller than or equal to a predetermined value (50, in this example). However, the present invention is not limited to this, and instead, a judgment may be performed as to whether the key contact value of the key directly above the target key is equal to or greater than a predetermined value which is set greater in value than the key press detection threshold. As description has been made in (7) above, a similar configuration may be made even in cases where the calculation of difference is performed using the key directly to the right of the target key and/or the key directly to the left of the target key.

It is preferable that the predetermined value which is set greater than the key press detection threshold as description has been made in the above be determined, for example, by having the user actually perform operations for several times on the portable terminal. Accordingly, the predetermined value may be determined based on the results yielded.

(9) In the embodiment, description is made that the touchpad 102 sends, to the control unit 110, at least one pair of values consisting of a coordinate value (x, y) of the contacted position and an electrostatic capacity value of the contacted position, and the calculation unit 111 calculates a key contact value for each of the keys based on the at least one pair of values. However, modification may be made as described in the following.

That is, a touchpad pertaining to this modification (referred to as a "modified touchpad" hereinafter) may be configured to output, for each of the keys, a value which increases/decreases according to the size of the contacted area within a coordinate area corresponding to a key. Further, the calculation unit pertaining to this modification (referred to as a "modified calculation unit" hereinafter) may calculate a key contact value for each of the keys of the touchpad 102 according to the mode thereof (adjustment mode or non-adjustment mode).

More specifically, in such a modification, the twenty ports of the capacitive touch sensor IC (Integrated Circuit) for realizing the modified touchpad are allocated in one-to-one correspondence to the keys of the modified touchpad. A value which increases/decreases between 0-1024 according to the contacted area within the coordinate area corresponding to a key is input, for each of the keys, to the modified calculation unit via each of the ports. Further, the number of ports provided to the IC is not limited to twenty as provided in the above example, and may be changed as necessary.

(10) Further, the components on which explanation has been made in the embodiment may be partially or entirely embodied as an integrated circuit having one chip or multiple chips. Further, the components may also be embodied as a computer program or as any type of embodiment.

Further, the components explanation of which has been made in the embodiment operate in a cooperative manner with the processor included in the mobile phone, and thus, realize the functions provided thereto.

(11) It may be conceived to distribute a program for causing a CPU (Central Processing Unit) to execute the operations to be performed in response to input from the touchpad 102 (refer to FIGS. 6 and 10) as explanation has been made in the embodiment. The distribution of such a program may be realized by recording the program onto recording media, or transmitting the program via various communication paths. The recording media which may be used in such distribution of the program include IC cards, optical discs, flexible disks, ROMs, flash memories, and the like. The distributed program is to be stored to a memory or the like which may be read by the CPU provided to devices, so that the CPU may access and execute the program. Thereby, each of the functions of each of the mobile phones description has been made on in the embodiment is to be realized.

(12) In the following, description is provided on a structure of a portable terminal pertaining to one embodiment of the present invention as well as on modifications thereof. Additionally, description is made on the advantageous effects of such portable terminals.

(a) One embodiment of the present invention provides a portable terminal comprising: a touchpad configured to detect contact made thereto and output a value indicating a degree of the contact; an adjustment unit configured to generate, based on the value output by the touchpad, an area contact value for each of one or more contacted areas of the touchpad to which the contact has been made, while being switched between a first mode for generating, as the area contact value, a value indicating a degree of the contact to the contacted area and a second mode for generating, as the area contact value, a value by performing adjustment such that a temporal change amount of the value indicating the degree of the contact to the contacted area is equal to or less than a predetermined value; a storage unit configured to store therein a first threshold and a second threshold less than the first threshold; a switch control unit configured to, when an area contact value of one of the contacted areas generated by the adjustment unit in the second mode equals or exceeds the first threshold, switch the adjustment unit to the first mode, and when an area contact value of one of the contacted areas generated by the adjustment unit in the first mode falls below the second threshold, switch the adjustment unit to the second mode; and a determination unit configured to determine, as a target area to which processing to be performed is allocated, one of the contacted areas having an area contact value that equals or exceeds the first threshold.

Another embodiment of the present invention provides an input control program for use in a portable terminal including a touchpad configured to detect contact made thereto and output a value indicating a degree of the contact, the input control program comprising: an adjustment step of generating, based on the value output by the touchpad, an area contact value for each of one or more contacted areas of the touchpad to which the contact has been made, while processing to be performed is switched between processing in a first mode for generating, as the area contact value, a value indicating a degree of the contact to the contacted area and processing in a second mode for generating, as the area contact value, a value by performing adjustment such that a temporal change amount of the value indicating the degree of the contact to the contacted area is equal to or less than a predetermined value; a storage step of storing a first threshold and a second threshold less than the first threshold; a switch control step of, when an area contact value of one of the contacted areas generated in the adjustment step in the second mode equals or exceeds the first threshold, switching processing to be performed in the adjustment step to the processing in the first mode, and when an area contact value of one of the contacted areas generated in the adjustment step in the first mode falls below the second threshold, switching processing to be performed in the adjustment step to the processing in the second mode; and a determination step of determining, as a target area to which processing to be performed is allocated, one of the contacted areas having an area contact value that equals or exceeds the first threshold.

Yet another embodiment of the present invention provides an input control method for use in a portable terminal including a touchpad configured to detect contact made thereto and output a value indicating a degree of the contact, the input control method comprising: an adjustment step of generating, based on the value output by the touchpad, an area contact value for each of one or more contacted areas of the touchpad to which the contact has been made, while processing to be performed is switched between processing in a first mode for generating, as the area contact value, a value indicating a degree of the contact to the contacted area and processing in a second mode for generating, as the area contact value, a value by performing adjustment such that a temporal change amount of the value indicating the degree of the contact to the contacted area is equal to or less than a predetermined value; a storage step of storing a first threshold and a second threshold less than the first threshold; a switch control step of, when an area contact value of one of the contacted areas generated in the adjustment step in the second mode equals or exceeds the first threshold, switching processing to be performed in the adjustment step to the processing in the first mode, and when an area contact value of one of the contacted areas generated in the adjustment step in the first mode falls below the second threshold, switching processing to be performed in the adjustment step to the processing in the second mode; and a determination step of determining, as a target area to which processing to be performed is allocated, one of the contacted areas having an area contact value that equals or exceeds the first threshold.

According to the portable terminal pertaining to one embodiment of the present invention having the above structure, from when contact made to the touchpad is detected to when an area contact value of one contacted area equals or exceeds the first threshold, the adjustment unit operates in the second mode. The adjustment unit in the second mode generates, as an area contact value, a value for each contacted area of the touchpad, by performing adjustment such that a temporal change amount of a value indicating a degree of contact to the contacted area is equal to or less than the predetermined value. Therefore, according to the portable terminal pertaining to one embodiment, it is possible to reduce an erroneous operation such as a case where even when contact is not actually being made to the touchpad, a value indicating a degree of contact exceeds the first threshold due to noises resulting from operations of respective function units of making phone calls, taking photographs, and so on provided to a conventional portable terminal, and this leads to performance of processing allocated to an area having an area contact value that equals or exceeds the first threshold.

Also, from when contact made to the touchpad is detected and an area contact value of one contacted area equals or exceeds the first threshold to when the contact made to the touchpad is released and the area contact value of the one contacted area falls below the second threshold, the adjustment unit operates in the first mode. The adjustment unit in the first mode generates an exact value indicating a degree of contact for each contacted area of the touchpad based on a value output by the touchpad indicating a degree of contact made to the touchpad. That is, the adjustment unit in the first mode generates, as an area contact value, a value, without performing adjustment such that a temporal change amount of the value indicating the degree of contact to the contacted area to equal or fall below the predetermined value. Accordingly, it is possible to reduce a time period from when contact to the touchpad is released to when an area contact value of one contacted area falls below the second threshold, compared with the case where the adjustment unit operates in the second mode.

Therefore, it is possible to reduce a necessary time period for the user to become able to contact the touchpad using his/her finger or the like to perform a subsequent operation after the user has once contacted the touchpad using his/her finger or the like to perform processing in the portable terminal and released the contact. This makes the portable terminal to be highly responsive to continuous operations performed on the touchpad by the user.

(b) Also, until the area contact value of the contacted area determined as the target area falls below the second threshold, the determination unit may not determine a subsequent target area.

With this structure, until an area contact value of a contacted area determined as a target area falls below the second threshold, the portable terminal does not determine a subsequent target area. From when contact made to the touchpad is detected and an area contact value of one contacted area equals or exceeds the first threshold to when the contact made to the touchpad is released and the area contact value of the one contacted area falls below the second threshold, the adjustment unit operates in the first mode. Accordingly, it is possible to reduce a time period from when contact to the touchpad is released to when an area contact value of one contacted area falls below the second threshold, compared with the case where the adjustment unit operates in the second mode.

This makes the portable terminal to be highly responsive to continuous operations performed on the touchpad by the user.

(c) Also, the storage unit may further store therein a third threshold less than the first threshold, and only when the contacted areas include less than a predetermined number of contacted areas each having an area contact value that equals or exceeds the third threshold, the determination unit may perform the determination.

With this structure, even when a contacted area has an area contact value that equals or exceeds the first threshold, the portable terminal does not determine a target area as long as a predetermined number or more of contacted areas each have an area contact value that equals or exceeds the third threshold, which is less than the first threshold for use in target area determination. In other words, it is possible to prevent an erroneous operation such as a case where processing is performed, which is allocated to a contacted area having an area contact value that equals or exceeds the first threshold even though a predetermined number or more of contacted areas each have an area contact value that equals or exceeds the third threshold.

Furthermore, when an area contact value of one contacted area equals or exceeds the first threshold, the adjustment unit is switched to the first mode. Then, the adjustment unit generates a value for each contacted area of the touchpad, without performing adjustment such that a temporal change amount of a value indicating a degree of the contact to the contacted area to equal or falls below the predetermined value. In other words, a contacted area, whose contact occurs later than the contact to the one contacted area that equals or exceeds the first threshold, might have an area contact value that equals or exceeds the third threshold. Accordingly, it is possible to prevent an erroneous operation such as a case where processing is performed, which is allocated to one contacted area having an area contact value that equals or exceeds the first threshold even though a predetermined number or more of contacted areas, whose contact occurs later than the contact to the one contacted area that equals or exceeds the first threshold, each have an area contact value that equals or exceeds the third threshold.

(13) The touchpad pertaining to the present invention corresponds to the touchpad 102 pertaining to the embodiment, the adjustment unit pertaining to the present invention corresponds to the calculation unit 111 pertaining to the embodiment, and the combination of the storage unit, the switch control unit, and the determination unit pertaining to the present invention corresponds to the switching unit 112 and the key determination unit pertaining to the embodiment.

(14) The present invention may be a method for use in mobile phones, as well as a computer program for realizing such a method with the use of a computer.

INDUSTRIAL APPLICABILITY

The mobile phone pertaining to the present invention is used by a user when making operations on a touchpad.

REFERENCE SIGNS LIST 1, 2 housing
3 input keys
4 LCD
100 mobile phone
101 sub LCD 102 touchpad
103 communication unit
104 speaker
105 microphone
106 vibrator
110 control unit
111 calculation unit
112 switching unit
113 key determination unit
114 event notification unit
115 audio processing unit
116 display control unit
120 application execution unit

The invention claimed is:

1. A portable terminal comprising:
a touchpad configured to detect contact made thereto and output a contact value indicating a degree of the contact;
an adjustment unit configured to generate, based on the contact value output by the touchpad, an area contact value for each of one or more contacted areas of the touchpad to which the contact has been made, and to be switched between
a non-adjustment mode in which the area contact value increases or decreases based on the contact value for the contacted area, and
an adjustment mode in which, when a difference between a current contact value and a previous contact value is greater than a predetermined value, the area contact value is incremented or decremented by the predetermined value such that the area contact value increases or decreases in a staircase-like manner;
a storage unit configured to store therein a first threshold and a second threshold less than the first threshold;
a switch control unit configured to,
when the area contact value of one of the contacted areas generated by the adjustment unit in the adjustment mode equals or exceeds the first threshold, switch the adjustment unit to the non-adjustment mode for that contacted area, and
when the area contact value of one of the contacted areas generated by the adjustment unit in the non-adjustment mode falls below the second threshold, switch the adjustment unit to the adjustment mode for that contacted area; and
a determination unit configured to determine, as a target area to which processing to be performed is allocated, one of the contacted areas having the area contact value that equals or exceeds the first threshold.

2. The portable terminal of claim 1, wherein until the area contact value of the contacted area determined as the target area falls below the second threshold, the determination unit does not determine a subsequent target area.

3. The portable terminal of claim 2, wherein the storage unit further stores therein a third threshold less than the first threshold, and only when the contacted areas include less than a predetermined number of contacted areas each having an area contact value that equals or exceeds the third threshold, the determination unit performs the determination.

4. A non-transitory computer-readable medium having stored therein an input control program for use in a portable terminal including a touchpad configured to detect contact made thereto and output a contact value indicating a degree of the contact, the input control program comprising:
an adjustment module that generates, based on the contact value output by the touchpad, an area contact value for each of one or more contacted areas of the touchpad to which the contact has been made, and is configured to switch between
processing in a non-adjustment mode in which the area contact value increases or decreases based on the contact value for the contacted area, and
processing in an adjustment mode in which, when a difference between a current contact value and a previous contact value is greater than a predetermined value, the area contact value is incremented or decremented by the predetermined value such that the area contact value increases or decreases in a staircase-like manner;
a storage module that stores a first threshold and a second threshold less than the first threshold;
a switch control module that, when the area contact value of one of the contacted areas generated in the adjustment step in the adjustment mode equals or exceeds the first threshold, switches processing to be performed in the adjustment module for the contacted area to the processing in the non-adjustment, and when the area contact value of one of the contacted areas generated in the adjustment step in the non-adjustment mode falls below the second threshold, switches processing to be performed in the adjustment module for the contacted area to the processing in the adjustment mode; and
a determination step of determining, as a target area to which processing to be performed is allocated, one of the contacted areas having the area contact value that equals or exceeds the first threshold.

5. An input control method for use in a portable terminal including a touchpad configured to detect contact made thereto and output a contact value indicating a degree of the contact, the input control method comprising:
an adjustment step of generating, based on the contact value output by the touchpad, an area contact value for each of one or more contacted areas of the touchpad to which the contact has been made, while processing to be performed is switched between
processing in a non-adjustment mode in which the area contact value increases or decreases based on the contact value for the contacted area, and
processing in an adjustment mode in which, when a difference between a current contact value and a previous contact value is greater than a predetermined value, the area contact value is incremented or decremented by the predetermined value such that the area contact value increases or decreases in a staircase-like manner;
a storage step of storing a first threshold and a second threshold less than the first threshold;
a switch control step of, when the area contact value of one of the contacted areas generated in the adjustment step in the adjustment mode equals or exceeds the first threshold, switching processing to be performed in the adjustment step for the contacted area to the processing in the non-adjustment mode, and when the area contact value of one of the contacted areas generated in the adjustment step in the non-adjustment mode falls below the second threshold, switching processing to be performed in the adjustment step for the contacted area to the processing in the adjustment mode; and
a determination step of determining, as a target area to which processing to be performed is allocated, one of the contacted areas having the area contact value that equals or exceeds the first threshold.

6. The portable terminal of claim 1, wherein, in the adjustment mode, the area contact value is incremented or decremented by the predetermined value after each of one or more time intervals for which a difference between a current contact value and a previous contact value is greater than the predetermined value.

* * * * *